(12) United States Patent
Narla

(10) Patent No.: US 11,309,714 B2
(45) Date of Patent: Apr. 19, 2022

(54) MICRO-BATTERIES FOR ENERGY GENERATION SYSTEMS

(71) Applicant: Tesla, Inc., Palo Alto, CA (US)

(72) Inventor: Sandeep Narla, San Jose, CA (US)

(73) Assignee: Tesla, Inc., Austin, TX (US)

( * ) Notice: Subject to any disclaimer, the term of this patent is extended or adjusted under 35 U.S.C. 154(b) by 115 days.

(21) Appl. No.: 15/341,984

(22) Filed: Nov. 2, 2016

(65) Prior Publication Data

US 2018/0123348 A1 May 3, 2018

(51) Int. Cl.
*H02J 3/38* (2006.01)
*H02J 7/35* (2006.01)
*H02J 3/46* (2006.01)

(52) U.S. Cl.
CPC .............. *H02J 3/385* (2013.01); *H02J 7/35* (2013.01); *H02J 3/46* (2013.01); *H02J 2207/20* (2020.01); *Y02E 10/56* (2013.01)

(58) Field of Classification Search
CPC .......... H02J 3/385; H02J 7/35; H02J 2207/20; H02J 3/46; Y02E 10/566; Y02E 10/58
USPC .......................................................... 307/24
See application file for complete search history.

(56) References Cited

U.S. PATENT DOCUMENTS

| | | |
|---|---|---|
| 3,377,539 A | 4/1968 | Bates |
| 4,183,079 A | 1/1980 | Wachi |
| 4,488,136 A | 12/1984 | Hansen et al. |
| 4,772,994 A | 9/1988 | Harada et al. |
| 5,404,059 A | 4/1995 | Loeffler |
| 5,576,941 A | 11/1996 | Nguyen et al. |
| 5,636,107 A | 6/1997 | Lu et al. |
| 5,726,615 A | 3/1998 | Bloom |
| 5,946,206 A | 8/1999 | Shimizu et al. |
| 5,982,645 A | 11/1999 | Levran et al. |

(Continued)

FOREIGN PATENT DOCUMENTS

| | | |
|---|---|---|
| CN | 102088190 A | 6/2011 |
| CN | 102113194 A | 6/2011 |

(Continued)

OTHER PUBLICATIONS

Decision to Grant received for European Patent Application No. 12715705.5, dated Mar. 26, 2020, 2 pages.

(Continued)

*Primary Examiner* — Daniel Cavallari
*Assistant Examiner* — Swarna N Chowdhuri
(74) *Attorney, Agent, or Firm* — Dentons US LLP

(57) ABSTRACT

Embodiments disclose an energy generation system including a photovoltaic (PV) array including a plurality of PV modules for generating direct current (DC) power, a plurality of power converter pairs coupled to the plurality of PV modules and configured to convert the generated DC power to alternating current (AC) power, and a plurality of battery packs coupled to the plurality of power converter pairs. Each power converter pair of the plurality of power converter pairs includes a DC-to-DC converter coupled to a DC-to-AC inverter, where the DC-to-DC converter is directly coupled to a respective PV module. Furthermore, each battery pack is directly coupled to a respective DC-to-DC converter and configured to store DC power from the respective PV module and output stored DC power to the respective power converter pair.

14 Claims, 12 Drawing Sheets

(56) References Cited

U.S. PATENT DOCUMENTS

| | | | |
|---|---|---|---|
| 6,055,169 A | 4/2000 | Bowman et al. | |
| 6,211,657 B1 | 4/2001 | Goluszek | |
| 6,307,350 B1 | 10/2001 | Aiderman | |
| 6,311,137 B1 | 10/2001 | Kurokami et al. | |
| 6,335,871 B1 | 1/2002 | Kita et al. | |
| 6,445,599 B1 | 9/2002 | Nguyen | |
| 6,807,069 B2 | 10/2004 | Nieminen et al. | |
| 6,888,728 B2 | 5/2005 | Takagi et al. | |
| 7,471,524 B1 | 12/2008 | Batarseh et al. | |
| 7,518,886 B1 | 4/2009 | Lai et al. | |
| 7,728,708 B2 | 6/2010 | Fushimi et al. | |
| 7,800,247 B2 | 9/2010 | Chang et al. | |
| 7,804,193 B2 | 9/2010 | Yan et al. | |
| 8,338,987 B2 | 12/2012 | O'Brien et al. | |
| 8,369,113 B2 | 2/2013 | Rodriguez | |
| 8,391,031 B2 | 3/2013 | Garrity | |
| 8,410,889 B2 | 4/2013 | Garrity et al. | |
| 8,633,670 B2 | 1/2014 | Choi | |
| 8,674,668 B2 | 3/2014 | Chisenga et al. | |
| 8,716,891 B2 | 5/2014 | Choi | |
| 8,743,570 B2 | 6/2014 | Mueller et al. | |
| 8,934,269 B2 | 1/2015 | Garrity | |
| 9,048,353 B2 | 6/2015 | Casey et al. | |
| 9,082,897 B2 | 7/2015 | Liu et al. | |
| 9,236,790 B2 | 1/2016 | Inakagata | |
| 9,331,499 B2 | 5/2016 | Ikriannikov et al. | |
| 9,368,964 B2 | 6/2016 | Adest et al. | |
| 9,444,397 B2 | 9/2016 | Estes | |
| 10,424,936 B2 | 9/2019 | Garrity | |
| 2001/0056330 A1 | 12/2001 | Wills | |
| 2003/0185026 A1 | 10/2003 | Matsuda et al. | |
| 2004/0076028 A1 | 4/2004 | Achleitner et al. | |
| 2004/0145928 A1 | 7/2004 | Takada | |
| 2004/0189432 A1 | 9/2004 | Yan et al. | |
| 2004/0190314 A1 | 9/2004 | Yoshida | |
| 2004/0233685 A1 | 11/2004 | Matsuo et al. | |
| 2006/0083039 A1 | 4/2006 | Oliveira et al. | |
| 2007/0133241 A1 | 6/2007 | Mumtaz et al. | |
| 2007/0164612 A1 | 7/2007 | Wendt et al. | |
| 2007/0217239 A1 | 9/2007 | Rottger et al. | |
| 2007/0290656 A1 | 12/2007 | Lee | |
| 2009/0066291 A1 | 3/2009 | Tien et al. | |
| 2009/0168461 A1 | 7/2009 | Nakahori | |
| 2011/0007527 A1 | 1/2011 | Liu et al. | |
| 2011/0051468 A1 | 3/2011 | Kyono | |
| 2011/0080044 A1* | 4/2011 | Schmiegel | H02J 3/383 307/23 |
| 2011/0133552 A1 | 6/2011 | Binder et al. | |
| 2011/0133558 A1 | 6/2011 | Park | |
| 2011/0144822 A1* | 6/2011 | Choi | H02J 3/32 700/297 |
| 2011/0204635 A1 | 8/2011 | Miller | |
| 2011/0232714 A1 | 9/2011 | Bhavaraju et al. | |
| 2012/0019074 A1 | 1/2012 | Frolov et al. | |
| 2012/0063177 A1 | 3/2012 | Garrity | |
| 2012/0081937 A1 | 4/2012 | Phadke | |
| 2012/0153722 A1 | 6/2012 | Nazarian | |
| 2012/0212065 A1* | 8/2012 | Cheng | H02J 3/385 307/82 |
| 2012/0228935 A1* | 9/2012 | Nakashima | H02J 3/385 307/24 |
| 2012/0249078 A1 | 10/2012 | Kim et al. | |
| 2012/0262953 A1 | 10/2012 | Jungreis et al. | |
| 2012/0326504 A1* | 12/2012 | Ballantine | H02J 9/06 307/24 |
| 2013/0106196 A1 | 5/2013 | Johnson et al. | |
| 2013/0134782 A1 | 5/2013 | Seon | |
| 2013/0181519 A1 | 7/2013 | Lee | |
| 2013/0181527 A1 | 7/2013 | Bhowmik | |
| 2013/0187473 A1 | 7/2013 | Deboy et al. | |
| 2013/0201737 A1 | 8/2013 | Chiang et al. | |
| 2013/0207466 A1* | 8/2013 | Lee | H02J 3/28 307/23 |
| 2013/0229842 A1 | 9/2013 | Garrity | |
| 2013/0234518 A1* | 9/2013 | Mumtaz | H02M 7/44 307/46 |
| 2013/0260198 A1 | 10/2013 | Yokoura | |
| 2013/0328397 A1* | 12/2013 | Lee | H02J 3/32 307/23 |
| 2014/0015326 A1 | 1/2014 | Eberhardt et al. | |
| 2014/0062198 A1 | 3/2014 | Luo | |
| 2014/0077768 A1 | 3/2014 | Jung | |
| 2014/0079960 A1 | 3/2014 | Yun | |
| 2014/0117756 A1* | 5/2014 | Takahashi | H02J 3/383 307/23 |
| 2014/0203649 A1 | 7/2014 | Cheek et al. | |
| 2014/0217827 A1* | 8/2014 | Cheek | H02J 3/381 307/66 |
| 2015/0008864 A2 | 1/2015 | Wolter | |
| 2015/0021998 A1 | 1/2015 | Trescases et al. | |
| 2015/0076903 A1 | 3/2015 | Kanayama et al. | |
| 2015/0092453 A1 | 4/2015 | Ohtake et al. | |
| 2015/0171766 A1* | 6/2015 | Valiani | H02J 3/385 307/82 |
| 2015/0180232 A1* | 6/2015 | Mino | H02J 1/102 307/23 |
| 2015/0256092 A1 | 9/2015 | Garrity | |
| 2015/0288185 A1* | 10/2015 | Ellerkamp | H02J 7/35 307/22 |
| 2015/0381074 A1 | 12/2015 | Flett | |
| 2016/0111915 A1* | 4/2016 | Sellin | H02J 9/061 307/66 |
| 2016/0226252 A1 | 8/2016 | Kravtiz et al. | |
| 2016/0233560 A1 | 8/2016 | Kanoh et al. | |
| 2016/0241079 A1 | 8/2016 | Adest et al. | |
| 2017/0047740 A1 | 2/2017 | Narla | |
| 2017/0047741 A1 | 2/2017 | Narla | |
| 2017/0047742 A1 | 2/2017 | Narla | |
| 2017/0133943 A1 | 5/2017 | Garrity | |
| 2017/0331293 A1* | 11/2017 | Narla | H02J 3/385 |
| 2018/0248376 A1* | 8/2018 | Teramoto | H02J 7/0014 |
| 2019/0109458 A1* | 4/2019 | Yamauchi | H02J 3/38 |

FOREIGN PATENT DOCUMENTS

| | | |
|---|---|---|
| CN | 102290828 A | 12/2011 |
| CN | 102630361 A | 8/2012 |
| CN | 102638187 A | 8/2012 |
| CN | 103036243 A | 4/2013 |
| CN | 103155334 A | 6/2013 |
| CN | 103155335 A | 6/2013 |
| CN | 103904681 A | 7/2014 |
| DE | 102008056256 A1 | 5/2010 |
| EP | 0340006 A2 | 11/1989 |
| EP | 2056438 A2 | 5/2009 |
| EP | 2 587 623 B1 | 5/2011 |
| EP | 2365599 A1 | 9/2011 |
| EP | 2689525 A2 | 1/2014 |
| GB | 2419968 A | 5/2006 |
| GB | 2486509 A | 6/2012 |
| GB | 2491494 B | 5/2013 |
| JP | 2003-289674 A | 10/2003 |
| JP | 2008-278588 A | 11/2008 |
| WO | 1882/02134 A1 | 6/1982 |
| WO | 2000/70731 A1 | 11/2000 |
| WO | 2002/078164 A1 | 10/2002 |
| WO | 2006/089778 A2 | 8/2006 |
| WO | 2007/080429 A2 | 7/2007 |
| WO | 2007/111018 A1 | 10/2007 |
| WO | 2010/119324 A2 | 10/2010 |
| WO | 2011/101030 A1 | 8/2011 |
| WO | 2011/162025 A1 | 12/2011 |
| WO | 2012/043919 A1 | 4/2012 |
| WO | 2012/127208 A2 | 9/2012 |
| WO | 2014/020645 A1 | 2/2014 |

(56) References Cited

FOREIGN PATENT DOCUMENTS

| WO | 2014/192015 A2 | 12/2014 |
|---|---|---|
| WO | 2015/041249 A1 | 3/2015 |

OTHER PUBLICATIONS

Decision to Grant received for European Patent Application No. 16754636.5, dated Jul. 16, 2020, 2 pages.
Final Office Action received for U.S. Appl. No. 13/769,257, dated Mar. 20, 2014, 14 pages.
Final Office Action received for U.S. Appl. No. 14/537,032, dated Jan. 26, 2016, 18 pages.
Final Office Action received for U.S. Appl. No. 15/983,945, dated Apr. 8, 2019, 13 pages.
Final Office Action received for U.S. Appl. No. 15/161,118, dated Feb. 7, 2019, 15 pages.
Final Office Action received for U.S. Appl. No. 15/161,118, dated Sep. 19, 2019, 16 pages.
First Action Interview—Office Action received for U.S. Appl. No. 15/161,104, dated Sep. 14, 2018, 8 pages.
First Action Interview—Office Action received for U.S. Appl. No. 15/161,118, dated Sep. 25, 2018, 8 pages.
First Action Interview—Office Action received for U.S. Appl. No. 15/161,127, dated Sep. 20, 2018, 8 pages.
Intention to Grant received for European Patent Application No. 12715705.5, dated Oct. 14, 2019, 9 pages.
Intention to Grant received for European Patent Application No. 16754636.5, dated Mar. 3, 2020, 8 pages.
International Preliminary Report on Patentability received for PCT Patent Application No. PCT/GB2012/050515, dated Oct. 3, 2013, 16 pages.
International Preliminary Report on Patentability received for PCT Patent Application No. PCT/US2016/046921, dated Mar. 1, 2018, 7 pages.
International Preliminary Report on Patentability received for PCT Patent Application No. PCT/US2016/046926, dated Mar. 1, 2018, 7 pages.
International Preliminary Report on Patentability received for PCT Patent Application No. PCT/US2016/046927, dated Mar. 1, 2018, 9 pages.
International Search Report and Written Opinion received for PCT Patent Application No. PCT/GB2012/050515, dated Dec. 14, 2012, 19 pages.
International Search Report and Written Opinion received for PCT Patent Application No. PCT/US2016/046921, dated Nov. 18, 2016, 8 pages.
International Search Report and Written Opinion received for PCT Patent Application No. PCT/US2016/046926, dated Nov. 30, 2016, 8 pages.
International Search Report and Written Opinion received for PCT Patent Application No. PCT/US2016/046927, dated Oct. 24, 2016, 11 pages.
Non-Final Office Action received for U.S. Appl. No. 13/244,161, dated May 4, 2012, 14 pages.
Non-Final Office Action received for U.S. Appl. No. 13/769,257, dated Nov. 15, 2013, 14 pages.
Non-Final Office Action received for U.S. Appl. No. 14/537,032, dated Jun. 21, 2016, 18 pages.
Non-Final Office Action received for U.S. Appl. No. 14/537,032, dated Jun. 29, 2015, 21 pages.
Non-Final Office Action received for U.S. Appl. No. 15/161,118, dated May 30, 2019, 15 pages.
Non-Final Office Action received for U.S. Appl. No. 15/406,638, dated Oct. 19, 2017, 7 pages.
Non-Final Office Action received for U.S. Appl. No. 15/983,945, dated Dec. 18, 2018, 14 pages.
Notice of Allowance received for U.S. Appl. No. 13/244,161, dated Oct. 26, 2012, 7 pages.
Notice of Allowance received for U.S. Appl. No. 13/769,257, dated Aug. 4, 2014, 7 pages.
Notice of Allowance received for U.S. Appl. No. 14/537,032, dated Oct. 13, 2016, 8 pages.
Notice of Allowance received for U.S. Appl. No. 15/161,118, dated Jan. 3, 2020, 5 pages.
Notice of Allowance received for U.S. Appl. No. 15/161,127, dated Dec. 4, 2018, 7 pages.
Notice of Allowance received for U.S. Appl. No. 15/161,104, dated Jan. 22, 2019, 7 pages.
Notice of Allowance received for U.S. Appl. No. 15/406,638, dated Feb. 22, 2018, 7 pages.
Notice of Allowance received for U.S. Appl. No. 15/983,945, dated May 29, 2019, 7 pages.
Office Action received for Chinese Patent Application No. 201680047920.6, dated Jun. 30, 2020, 12 pages (Official Copy Only) (See Communication under 37 CFR § 1.98(a) (3)).
Office Action received for Chinese Patent Application No. 201680047927.8, dated Sep. 3, 2020, 9 pages (Official Copy Only) (See Communication under 37 CFR § 1.98(a) (3)).
Office Action received for Chinese Patent Application No. 201680047928.2, dated Sep. 3, 2020, 9 pages (Official Copy Only) (See Communication under 37 CFR § 1.98(a) (3)).
Office Action received for European Patent Application No. 12715705.5, dated Dec. 20, 2018, 13 pages.
Office Action received for European Patent Application No. 12715705.5, dated Jun. 14, 2018, 8 pages.
Office Action received for European Patent Application No. 12715705.5, dated Sep. 15, 2016, 14 pages.
Office Action received for European Patent Application No. 16754636.5, dated May 29, 2019, 5 pages.
Office Action received for European Patent Application No. 16754637.3, dated Dec. 11, 2019, 3 pages.
Office Action received for European Patent Application No. 16754637.3, dated May 28, 2019, 5 pages.
Pre-Interview First Office Action received for U.S. Appl. No. 15/161,104, dated Jun. 29, 2018, 5 pages.
Pre-Interview First Office Action received for U.S. Appl. No. 15/161,118, dated Jun. 29, 2018, 5 pages.
Pre-Interview First Office Action received for U.S. Appl. No. 15/161,127, dated Jun. 29, 2018, 5 pages.
Mumtaz et al., "Grid Connected PV Inverter using a Commercially Available Power IC", PV in Europe Conference, 2002, 3 pages.
Varela et al., "Current Mode with RMS Voltage and Offset Control Loops for a Single-Phase Aircraft Inverter Suitable for Parallel and 3-Phase Operation Mode", Energy Conversion Congress and Exposition (ECCE), IEEE, 2011, pp. 2562-2567.
Office Action received for Chinese Patent Application No. 201680047920.6, dated Apr. 2, 2021, 21 pages (10 pages of English Translation and 11 pages of Official Copy Only).
Office Action received for Chinese Patent Application No. 201680047927.8, dated Jun. 3, 2021, 17 pages (9 pages of English Translation and 8 pages of Official Copy).
Office Action received for European Patent Application No. 16754638.1, dated Mar. 3, 2021, 4 pages.

* cited by examiner

MICRO-BATTERIES FOR ENERGY GENERATION SYSTEMS

BACKGROUND

Decreasing costs, state and federal tax incentives, the availability of solar financing loans, solar leases, power purchase agreements, and increased awareness of the correlation between greenhouse gasses (e.g., carbon dioxide emissions) and climate change, among other factors, have increased the popularity of photovoltaic (PV) or "solar" energy generation systems with home owners, businesses and utility companies compared to other renewable energy sources.

A conventional solar energy generation system includes an array of PV modules connected together on one or more strings and a combination of individual component systems, such as a combiner for combining direct current (DC) outputs of the one or more strings to one or more string inverters for converting the combined DC output from the strings to alternating current (AC), and a physical interface to AC utility grid for exporting power/energy or use locally—typically on the load side of the utility meter, between the meter and the customer's main electrical panel. In jurisdictions that allow for net energy metering, the solar energy generation system provides excess AC power generated back to the AC grid, resulting in cost benefits to the customer and/or owner of the system.

Power outputted by conventional energy generation systems, however, is disproportionately reduced when one or more PV modules in a string are outputting less power due to various reasons such as shading, solar irradiation difference etc. When a shadow is cast over a portion of a string of PV modules, those PV modules are providing less power than PV modules that are not cast under the shadow, which thereby limits the overall power output of the entire string due to voltage and/or current limiting. To overcome such obstacles, micro-inverters have been designed to enable PV module-level energy generation where each PV module generates AC energy independently. Each micro-inverter can harvest optimum power from the string of PV modules by isolating those PV modules that are outputting less power such that they do not affect the overall power output of the entire string. Accordingly, power outputted by the string of PV modules is optimized regardless of whether one or more PV modules are not generating power.

Such energy generation systems can provide generated power/energy back to the utility grid, but are unable to store generated energy for use when the grid is unavailable, such as during an outage, or export to grid in the night time when solar is not available. Thus, on-site energy storage has been developed to store excess energy for use during grid outage or export energy in the nighttime. On-site energy storage also allows the customer to store energy generated during the day and then consume that power after the sun has set, reducing the customer's peak demand. Furthermore, on-site energy storage helps utilities stabilize the grid by supplying energy to enhance demand response, shave demand peaks, shift loads to lower demand and economic energy dispatch between peak and off-peak hours. Utilizing on-site energy storage, however, has decreased the efficiency of these energy generation systems. Thus, improvements to such energy generation systems are desired.

SUMMARY

Embodiments describe PV systems configured with micro-batteries, where each micro-battery is devoted to a particular PV module for storing energy at low voltage and converting DC power to AC power. Such PV systems may be referred to herein as "micro-battery PV systems". Micro-battery PV systems, when compared to conventional energy generation systems, are more efficient and less visibly intrusive in design.

In some embodiments an energy generation system includes: a photovoltaic (PV) array including a plurality of PV modules for generating direct current (DC) power; a plurality of power converter pairs coupled to the plurality of PV modules and configured to convert the generated DC power to alternating current (AC) power, each power converter pair of the plurality of power converter pairs includes a DC-to-DC converter coupled to a DC-to-AC inverter, where the DC-to-DC converter is directly coupled to a respective PV module; and a plurality of battery packs coupled to the plurality of power converter pairs, each battery pack is directly coupled to a respective DC-to-DC converter and configured to store DC power from the respective PV module and output stored DC power to the respective power converter pair.

The DC-to-DC converter of each power converter pair can be configured to buck and boost the generated DC power from the respective PV module. Each power converter pair can be further configured to perform maximum power-point tracking (MPPT) on generated DC power from its respective PV module. Each battery pack can be coupled to its respective power converter pair through a power cable that is plugged into a socket of a housing for the respective power converter pair. The plurality of power converter pairs and the plurality of battery packs can form a plurality of micro-batteries, each micro-battery including a power converter pair and a respective battery pack. The plurality of micro-batteries can be serially connected. The plurality of PV modules and the plurality of micro-batteries can be equal in number. Each micro-battery can be coupled to a different PV module. The plurality of micro-batteries can be coupled to less than all PV modules of the plurality of PV modules. Some micro-batteries can be coupled to more than one PV module of the plurality of PV modules. Each battery pack can include battery cells and a battery management system (BMS). Each battery pack can further include a battery pack DC-to-DC converter configured to buck and boost DC power from the DC-to-DC converter of the respective power converter pair.

In some embodiments, an energy generation system includes: a photovoltaic (PV) array including a plurality of PV modules for generating direct current (DC) power; and a plurality of micro-batteries coupled to the plurality of PV modules, each micro-battery including: a DC-to-DC converter directly coupled to a respective PV module and configured to receive generated DC power from the respective PV module and convert the generated DC power to a converted DC power having a different voltage level than the generated DC power; a DC-to-AC inverter coupled to the DC-to-DC converter and configured to receive the converted DC power and convert the converted DC power to alternating current (AC) power; and a battery pack coupled to the DC-to-DC converter, the battery pack configured to store DC power from the respective PV module and output stored DC power to the DC-to-DC converter.

The DC-to-DC buck-boost converter, the DC-to-AC inverter, and the battery pack can be housed within the same enclosure. The DC-to-DC converter of each inverter can be configured to buck and boost the generated DC power from the respective PV module. The plurality of micro-batteries can be coupled to less than all PV modules of the plurality of PV modules. The battery pack can include battery cells and a battery management system (BMS). The battery pack can further include a battery pack DC-to-DC converter configured to buck and boost DC power from the DC-to-DC converter.

In some embodiments, an energy generation device includes: a direct current (DC)-to-DC converter directly coupled to a photovoltaic (PV) module and configured to buck and boost a DC input power from the PV module to a converted DC power; a DC-to-alternating current (AC) converter coupled to the DC-to-DC converter and configured to convert the converted DC power to AC power; and a battery pack directly coupled to the DC-to-DC converter, the battery pack configured to store DC power generated by the PV module and discharge the stored DC power to the DC-to-DC converter.

The battery pack can include battery cells and a battery management system (BMS).

A better understanding of the nature and advantages of embodiments of the present disclosure may be gained with reference to the following detailed description and the accompanying drawings.

DETAILED DESCRIPTION

Solar energy generation systems according to embodiments of the present disclosure couple micro-batteries to respective PV modules in a solar energy generation system, thereby forming a micro-battery PV system. Each micro-battery can include a power converter coupled with an energy storage device, such as a battery pack. The battery pack enables DC power generated from a PV module to be stored before or in addition to being converted to AC power to output to a load(s) or the utility grid. Storing DC power prior to conversion to AC power reduces the number of power conversions needed to implement on-site energy storage for an energy generation system, thereby reducing power conversion losses and enhancing the overall efficiency of the energy generation system. This is unlike conventional micro-inverter energy generation systems with centralized power storage that have several more energy conversions which decreases the efficiency at which the energy generation system can provide stored power to a load or the utility grid, as will be discussed further herein.

I. Micro-Inverter PV System

Figure 1:
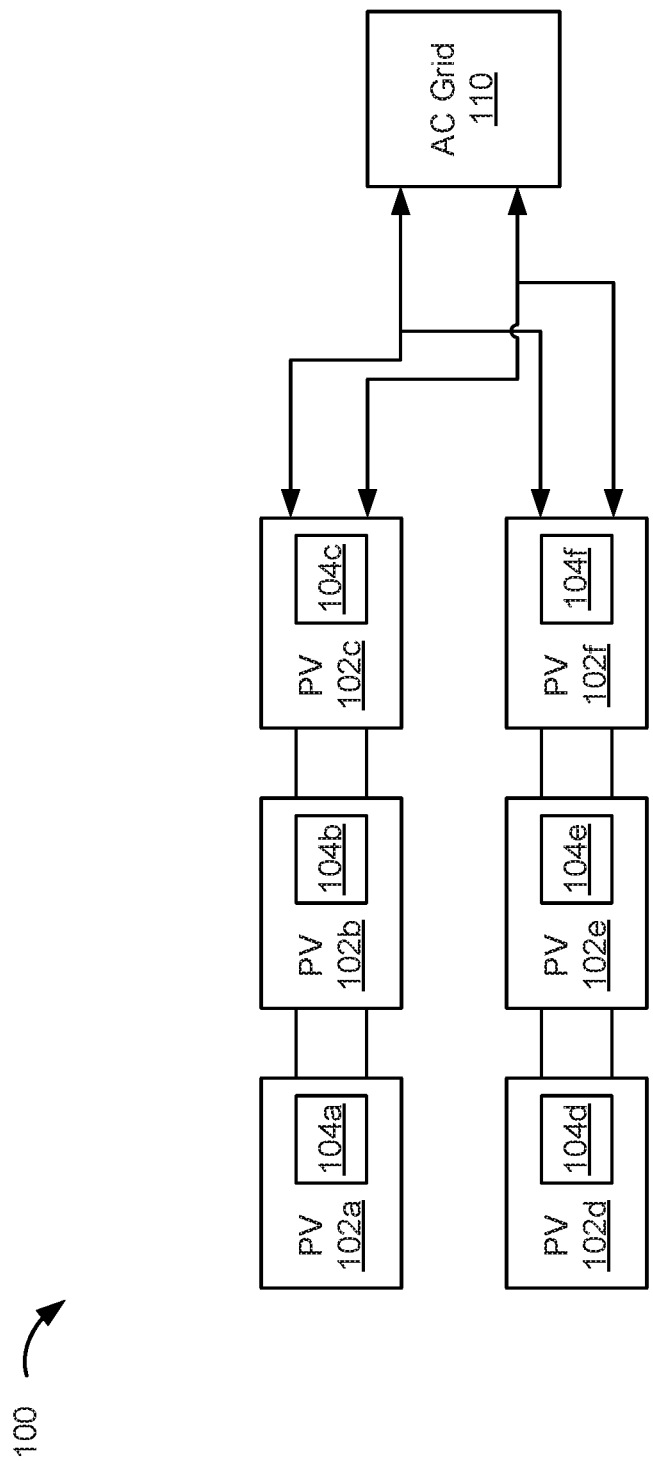
FIG. 1 is a block diagram of a micro-inverter PV system.

A micro-inverter PV system uses several smaller-sized inverters (matched to each PV module power rating) instead of one large string inverter (rated to match all combined PV strings) for converting DC power generated by a plurality of PV modules. Each micro-inverter may be dedicated to convert DC power from a respective PV module to AC power. Typically, a single micro-inverter will service between one and four PV modules. FIG. 1 illustrates exemplary conventional micro-inverter PV system 100. Micro-inverter PV system 100 can include a plurality of PV modules 102a-f for generating DC power, and a plurality of micro-inverters 104a-f for receiving the generated DC power from PV modules 102a-f and converting the generated DC power to AC power for outputting to AC grid 110. Each micro-inverter 102a-f can be coupled to a respective PV module 102a-f and be dedicated to converting DC power from that respective PV module. As an example, micro-inverter 104a may be coupled to PV module 102a and dedicated to converting DC power from PV module 102a to AC power.

The same can be said for micro-inverters 104b-f and PV modules 102b-f. Micro-inverters 104a-f can perform maximum power-point tracking (MPPT) on power provided by PV modules 102a-f.

Each micro-inverter 104a-f may be a specific type of micro-inverter, such as a parallel micro-inverter, serial micro-inverter, and an advanced micro-inverter. A parallel micro-inverter is coupled to other parallel micro-inverters in a parallel configuration for outputting AC power to AC grid 110. Each micro-inverter includes a DC-to-DC boost converter and a DC-to-AC inverter. The DC-to-DC boost converter may boost input voltage (20-100V) from the respective PV module to a high DC voltage (170-400V) and perform DC-to-AC conversion to output AC power to AC grid 110. In some cases, AC power can be outputted to an intermediate AC bus that runs from the array to an on-site interface to the AC grid, such as a customer's main electrical panel. This is because the output voltage of PV modules 102a-f may not be at a voltage level high enough to be over the voltage level of AC grid 110. In some embodiments, the boost converter can boost the input voltage to a level higher than the operating voltage of AC grid 110 to compensate for the expected power loss from converting DC power to AC power, such as a boost to 170V DC power for a 120V AC grid, 330V DC power for a 208Vac grid, 370V DC power for a 240V AC grid, and the like).

Unlike a parallel micro-inverter, a serial micro-inverter is coupled to other serial micro-inverters in a serial configuration for outputting AC power to AC grid 110. Each serial micro-inverter includes a DC-to-AC inverter for converting DC power to AC power. A DC-to-DC converter is not needed because AC power outputted by each serial micro-inverter can aggregate to output a combined power that is higher than each outputted power separately. The combined power output may have a voltage that is high enough to be compatible with AC grid 110.

In addition to parallel and serial micro-inverters, each micro-inverter 104a-f may be an advanced micro-inverter. An advanced micro-inverter is coupled to other advanced micro-inverters in a serial configuration for outputting AC power to AC grid 110. Each advanced micro-inverter receives generated DC voltage (20-100V) and adds the voltage as a time sequence step of an output AC waveform. The number of advanced micro-inverters can be chosen to match the voltage level of the AC grid.

Micro-inverter PV system 100 is suitable for outputting excess generated power back to AC grid 110, which may be advantageous for customers in jurisdictions that allow for net energy metering. PV system 100, however, cannot store the excess generated power for use when PV modules 102a-f are not generating power, such as at night or during a storm or blackout. Accordingly, micro-inverter PV systems with on-site energy storage have been developed to store excess energy for reasons discussed herein.

Figure 2:
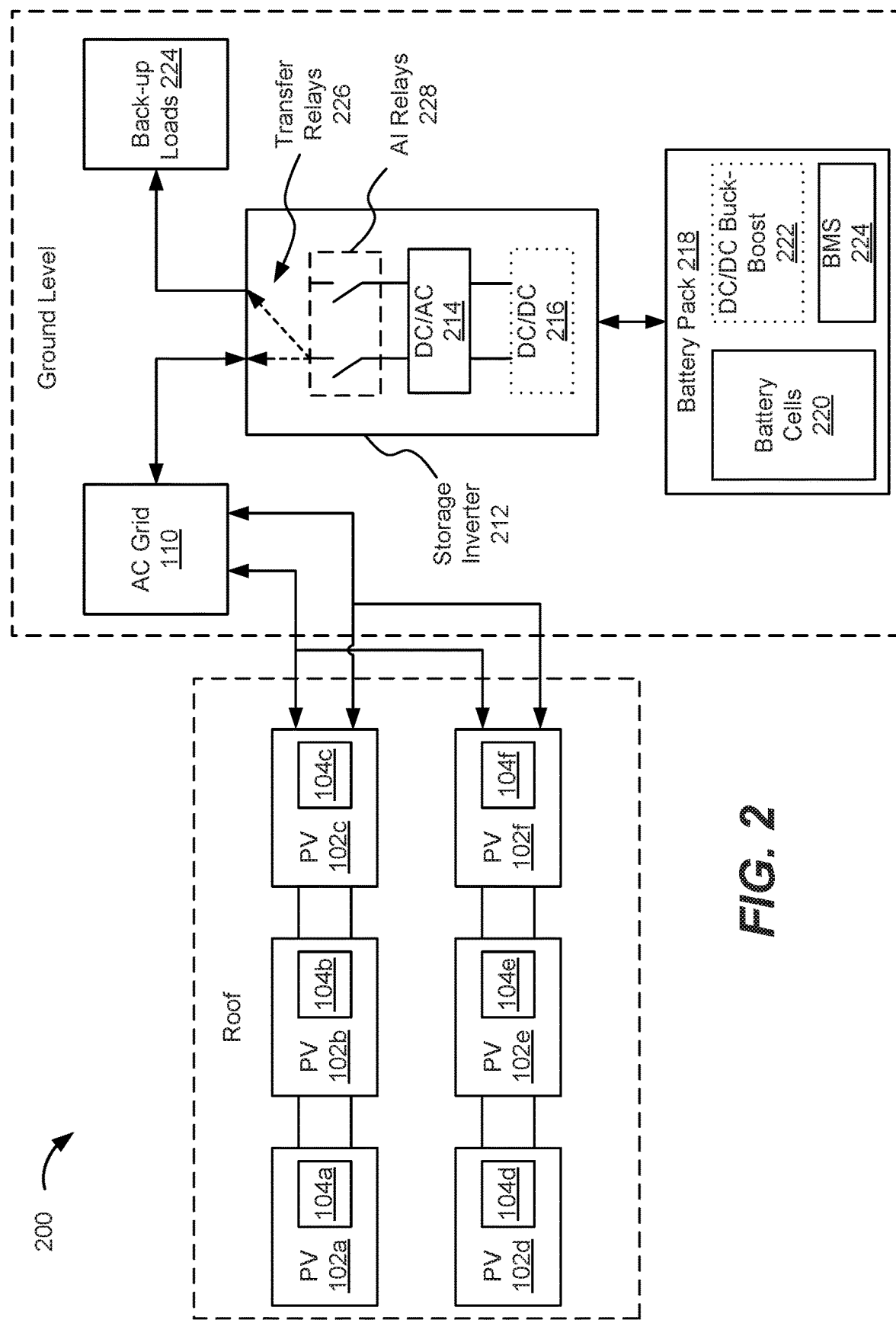
FIG. 2 is a block diagram of a micro-inverter PV system with on-site energy storage.

FIG. 2 illustrates exemplary micro-inverter PV system 200 with on-site energy storage. Having on-site energy storage enables PV system 200 to provide power to loads, e.g., back-up loads 224, at an installation site when AC grid 110 is unavailable, such as during an outage, or enable PV system 200 to export/import energy to/from AC grid 110 when AC grid 110 is available. PV system 200 includes PV modules 102a-f and micro-inverters 104a-f for receiving generated DC power from PV modules 102a-f and converting the generated DC power to AC power for outputting to AC grid 110. In addition to PV modules 102a-f and micro-inverters 104a-f, PV system 200 also includes storage inverter 212 and battery pack 218 for providing on-site energy storage. AC power can be provided by micro-inverters 104a-f and/or AC grid 110 to storage inverter 212, which can then convert the AC power to DC power and output the converted DC power to charge battery pack 218. Storage inverter 212 can include bi-directional DC-to-AC inverter 214 for converting the received AC power to DC power, and DC-to-DC converter 216 for boosting and/or bucking the converted DC power to a higher/lower DC power during charging and vice-versa for discharging.

Battery pack 218 can include battery cells 220 and battery management system (BMS) 224. Battery cells 220 may be an electro-chemical devices that are capable of storing charge, and BMS 224 may manage the operation of battery cells 220. Battery pack 218 can include a bi-directional DC-to-DC buck and/or boost converter 222 to manage the voltage level of power flowing into and out of battery cells 220. DC-to-DC buck/boost converter 222 and DC-to-DC converter 216 can be mutually exclusive in that there only need to be one DC-to-DC buck/boost converter for managing the voltage level of power provided to and from battery pack 218. Accordingly, in various embodiments, either DC-to-DC buck/boost converter 216 is present, DC-to-DC buck/boost converter 222 is present, or none of them are present, as indicated by dotted lines shown in FIG. 2.

Power stored in battery pack 218 can be provided to back-up loads 224 during AC grid 110 outage. To provide power to back-up loads 224, DC power stored in battery cells 220 is outputted to storage inverter 212, which converts the DC power to AC power and then outputs the converted AC power to back-up loads 224 or AC grid 110. Transfer relays 226 and anti-islanding relays 228 can be positioned at the output of DC-to-AC inverter 214 to manage power flow into and out of storage inverter 212. Transfer relays 226 can be electrical or mechanical relays capable of coupling an input between two outputs. For instance, transfer relays 226 can be mechanical relays configured to couple storage inverter 212 to AC grid 110 or back-up loads 224. Anti-islanding relays 228 can be switches configured to open and close an electrical path to allow or prevent power flow into and out of storage inverter 212. In some embodiments, transfer relays 226 can be positioned outside the storage inverter but still be controlled by it.

As can be appreciated by PV system 200 in FIG. 2, power provided by PV modules 102a-f by way of micro-inverters 104a-f must undergo several power conversions in order to provide on-site energy storage for PV system 200. For example, in addition to the power conversion from DC to AC power by micro-inverters 104a-f, the AC power further undergoes two additional power conversions, one additional power conversion to convert AC power to DC power for storing DC power in battery pack 218, and another additional power conversion to convert the stored DC power to AC power to output to back-up loads 224. Each power conversion results in power loss, which causes inefficient utilization of generated power from PV modules 102a-f. Additionally, because storage inverter 212 and battery pack 218 are positioned at the ground level instead of on the roof, the presence of storage inverter 212 and battery pack 218 is visible and thus can negatively impact the aesthetics of the installation site, especially when it is a residential building such as a customer's home.

II. Micro-Battery PV System

A micro-battery PV system, according to embodiments of the present disclosure, is more efficient than micro-inverter PV systems 100 and 200 discussed herein with respect to FIGS. 1 and 2 because it has less power conversions and is more optimized. Instead of requiring a separate storage inverter and a large battery pack, micro-battery PV systems do not need a separate storage inverter and splits the large battery pack into several smaller battery packs, each configured to store energy provided by one or more respective PV modules. Micro-battery PV systems include a plurality of micro-batteries where each micro-battery may be formed of at least one power converter and an energy storage device that can be housed in the same enclosure, or housed in separate enclosures, as will be discussed further herein. The power converter could be just DC/AC converter or DC/DC and DC/AC converter as appropriate to match the PV module and battery pack voltage. For example: if a PV module has Vmp (max power voltage) of 45V and when the battery voltage is 45V, then there is no need for additional DC-DC power converter to charge/discharge the battery from PV but a DC-DC power converter may be required to boost the PV and/or battery voltage to higher voltage for DC-AC conversion. So, the number of DC-DC converters inside the micro-battery depends on the voltages of PV module and the battery pack.

Figure 3:
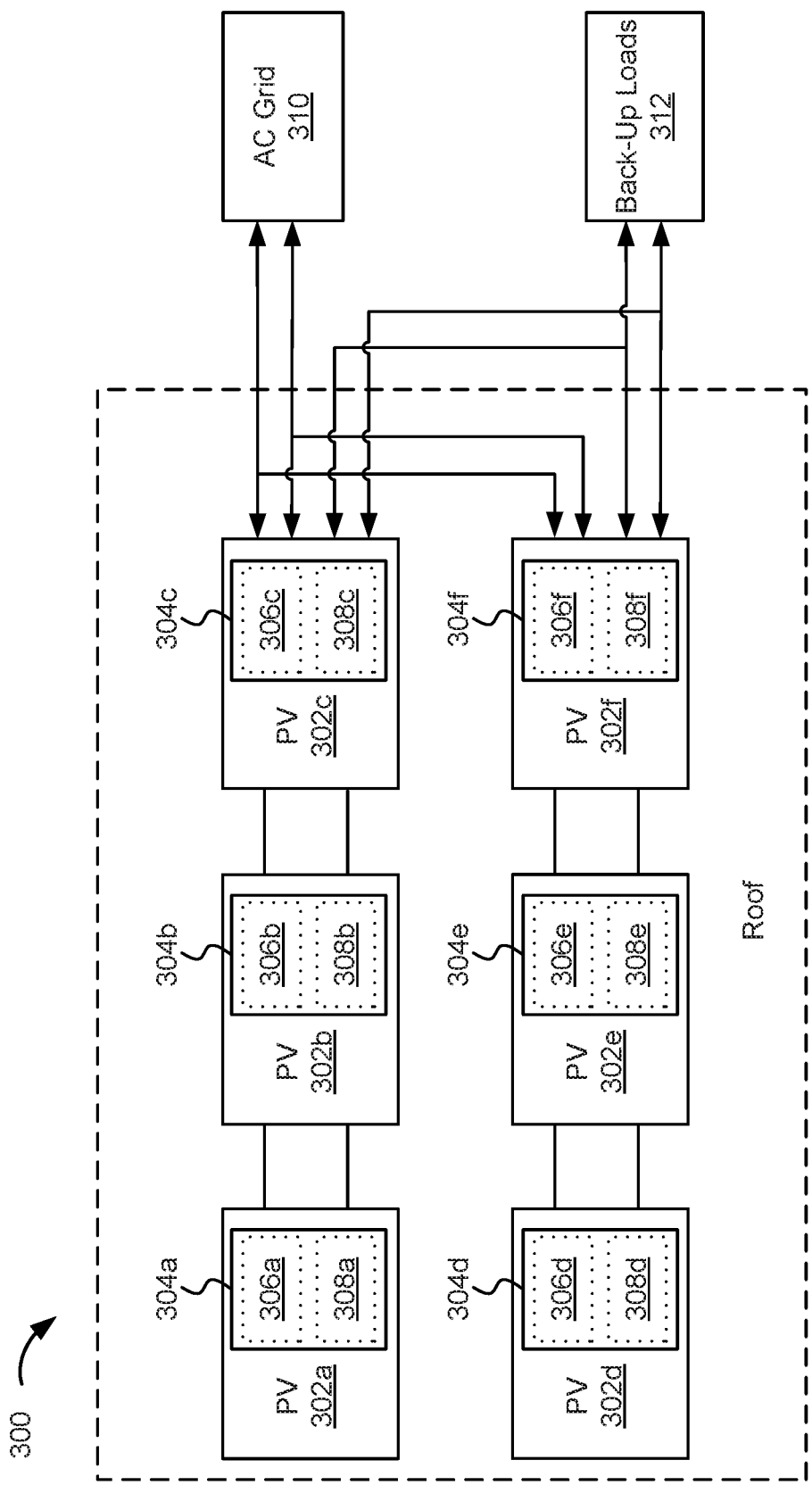
FIG. 3 is a block diagram of an exemplary micro-battery PV system where respective power converters and energy storage devices of each micro-battery are housed in the same enclosure, according to some embodiments of the present disclosure.

FIG. 3 illustrates exemplary micro-battery PV system 300, according to some embodiments of the present disclosure. Micro-battery PV system 300 can include PV modules 302a-f arranged in two strings of three PV modules each.

Although FIG. 3 illustrates only six PV modules arranged in two strings, embodiments are not limited to such configurations and that other micro-battery PV systems can have more or less PV modules arranged in more or less strings where each string includes more or less PV modules.

Each PV module 302a-f can be coupled to a respective micro-battery 304a-f, which can include at least one power converter 306a-f for converting DC power provided by respective PV modules 302a-f to AC power and outputting the converted AC power to AC grid 310 and/or back-up loads 312, as will be discussed in further detail herein. In some embodiments, the number of micro-batteries 304a-f is equal to the number of PV modules 302a-f such that each micro-battery is coupled to a different PV module. According to some embodiments of the present disclosure, each micro-battery 304a-f also includes an energy storage device, such as a respective one of battery packs 308a-f. Each battery pack 308a-f can store DC power provided by a respective PV module 302a-f prior to conversion to AC power.

Additionally, each battery pack 308a-f can output its stored DC power to be converted to AC power by a respective power converter 306a-f and subsequently be provided to AC grid 310 and/or back-up loads 312.

As can be appreciated herein, battery packs 308a-f are positioned to receive DC power from respective PV modules prior to conversion to AC power by power converters 306a-f. Being able to store the DC power prior to conversion to AC power eliminates two power conversions required in other PV systems without micro-batteries, such as PV system 200 in FIG. 2 (e.g., the conversion from DC power to AC power to output AC power to back-up loads 224, and the conversion from AC power to DC power to store energy in battery pack 218). Elimination of these two power conversions significantly increases the efficiency of the energy generation system because it avoids the power losses associated with the two additional power conversions. Furthermore, because a storage inverter and a battery pack are not positioned at the ground level, the aesthetics of the installation site is not negatively impacted by the presence of the energy generation system. In some embodiments, each micro-battery 304a-f is positioned proximate to a respective PV module 302a-f. For instance, each micro-battery 304a-f can be mounted directly underneath the respective PV module 302a-f. This will greatly simplify the process of system installation since all connections for PV module output, storage and AC output are incorporated in a single functional unit at the PV module. In some embodiments, the AC output to the AC grid and back-up loads could be two separate AC buses, provided there are internal transfer relays inside the micro-battery. In other embodiments, if the relay(s) is positioned external to the micro-battery or to the entire group of micro-batteries of the string/array, then the same AC output could output AC current into AC grid or provide AC voltage to back-up loads.

In some embodiments, each power converter 306a-f and battery pack 308a-f can be housed within the same enclosure, as shown in FIG. 3. Specifically, solid rectangle lines surrounding respective power converters 306a-f and battery packs 308a-f, and the separate dotted rectangle lines surrounding each individual inverter and battery pack, indicate that both respective power converters 306a-f and battery packs 308a-f are housed within the same enclosure. In additional or alternative embodiments, each power converter 306a-f and battery pack 308a-f can be housed within separate enclosures as shown in FIG. 4.

Figure 4:
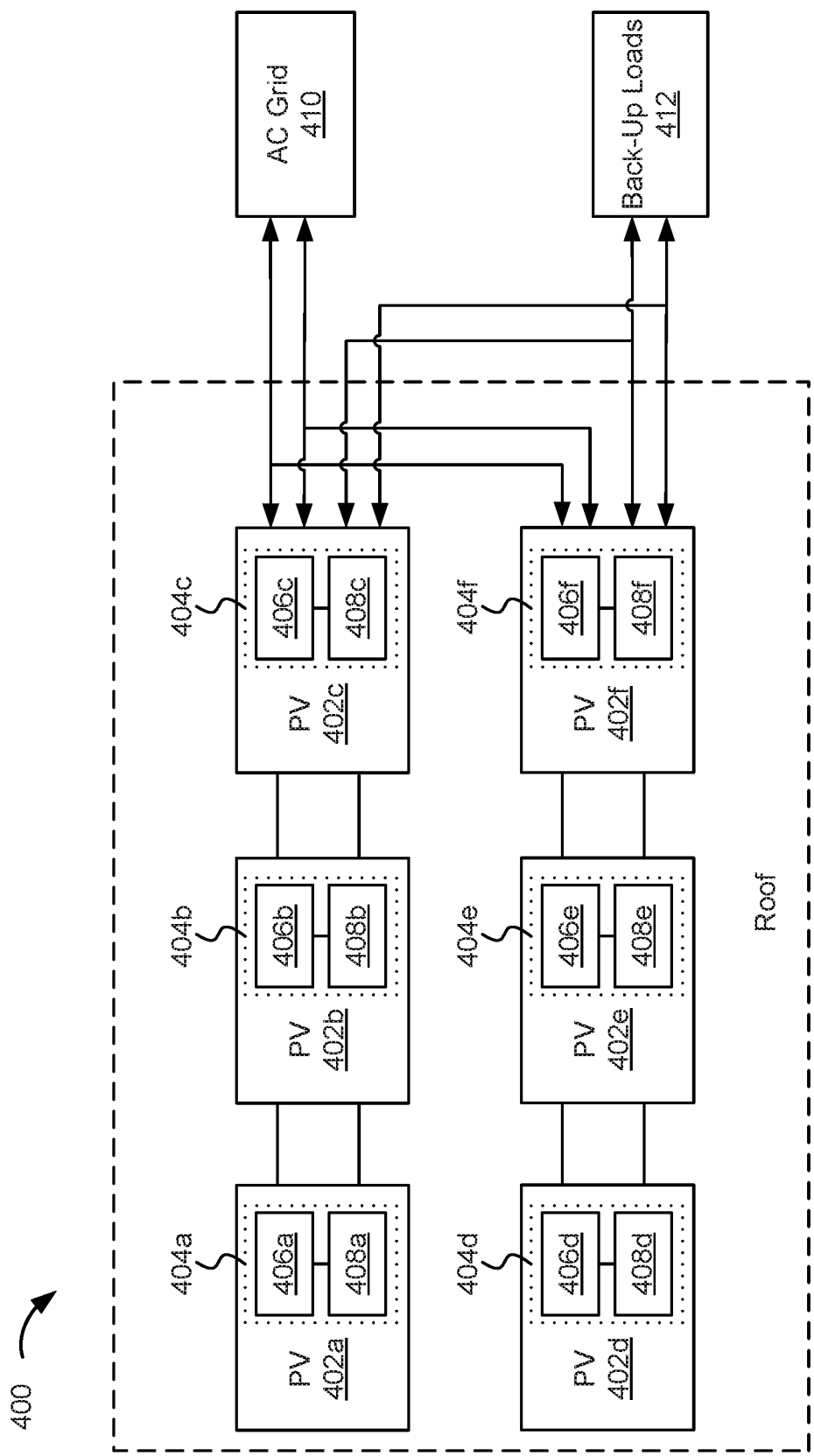
FIG. 4 is a block diagram of an exemplary micro-battery PV system where respective power converters and energy storage devices of each micro-battery are housed in separate enclosures, according to some embodiments of the present disclosure.

FIG. 4 illustrates exemplary micro-battery PV system 400 having micro-batteries 404 formed of power converters 406a-f and battery packs 408a-f that are housed in separate enclosures, according to some embodiments of the present disclosure. The dotted rectangles surrounding respective power converters 406a-f and battery packs 408a-f, and the separate solid rectangles surrounding each individual inverter and battery pack, indicate that both respective power converters 406a-f and battery packs 408a-f are housed within separate enclosures. In such instances, power converters 406a-f can be substantially similar to conventional micro-inverters in that each power converter 406a-f can be dedicated to converting DC power to AC power for respective PV modules, but is different in that each power converter 406a-f has a separate input plug for coupling with a respective battery pack 408a-f. In certain embodiments, the battery packs 408a-f can be plugged into sockets of housings for respective power converters 406a-f via an electrical cable. Thus, the housing of each power converter 406a-f can be configured to include an input socket to receive the electrical cable from a respective battery pack. Details of the structure of the micro-inverters for each configuration will be discussed further herein. In some embodiments, where the operating voltage (Vmp) of the PV module is different from battery pack voltage, there could be an internal DC-to-DC converter at the battery pack to match the PV voltage and also support DC-to-AC conversion accordingly.

Figure 5:
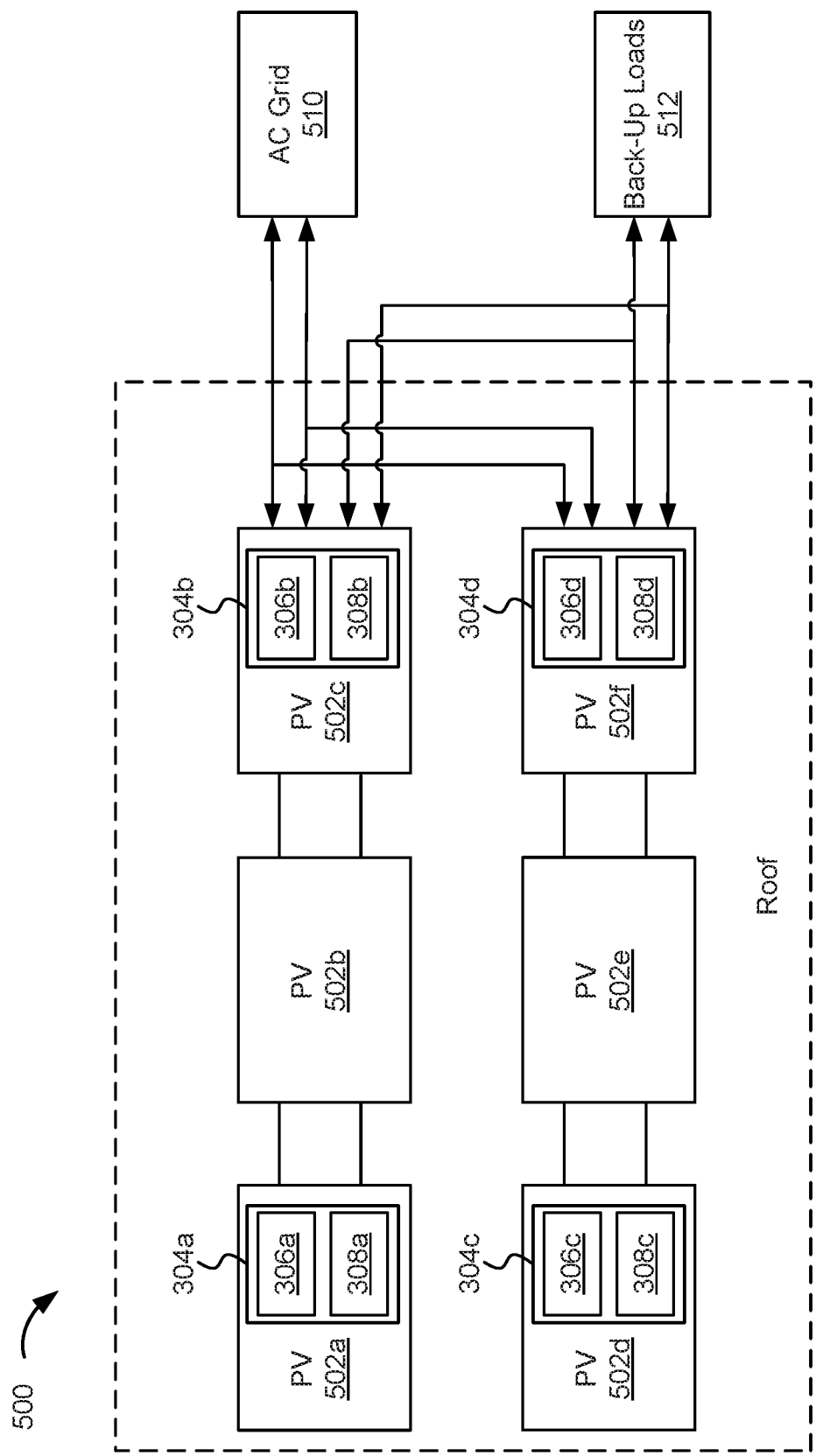
FIG. 5 is a block diagram of an exemplary micro-battery PV system where some micro-batteries are coupled to more than one PV module, according to some embodiments of the present disclosure.

Although FIGS. 3 and 4 illustrate micro-battery PV systems 300 and 400 as having a designated micro-battery for each respective PV module, embodiments are not limited to such configurations. In some alternative embodiments, a micro-battery may be coupled to more than one PV module at the intersection of power lines from the PV modules. FIG. 5 illustrates exemplary micro-battery PV system 500 where some micro-batteries are coupled to two PV modules. Although only showing a micro-battery coupled to two PV modules, it is to be appreciated that this architecture can expand to include more PV modules per micro-battery (e.g., three, four, or more PV modules per micro-battery).

In FIG. 5, micro-battery PV system 500 may include micro-batteries 504a-d, where some micro-batteries are coupled to more than one PV module in a PV string. However, each micro-battery is coupled to less than all of the PV modules. For instance, a string containing PV modules 502a-c can have micro-batteries 504a and 504b where micro-battery 504a is coupled to PV module 502a, and micro-battery 504b is coupled to PV modules 502b and 502c. Additionally, micro-battery 504c is coupled to PV module 502d, and micro-battery 504d is coupled to PV modules 502e and 502f. Thus, one or more micro-batteries can be configured to support more than one PV module.

A. Micro-Battery Structure

According to some embodiments of the present disclosure, micro-batteries can store DC power as well as convert stored DC power to AC power for outputting to the AC grid or back-up loads. Implementing energy storage utilization at the PV module level and in several smaller energy capacities/operating voltage levels can significantly improve the efficiency of the overall energy generation system by reducing the number of power conversions required to implement on-site energy storage for a PV system. As will be discussed further herein, each micro-battery can include at least one inverter and a battery pack that are housed in the same or separate enclosures.

Figure 6:
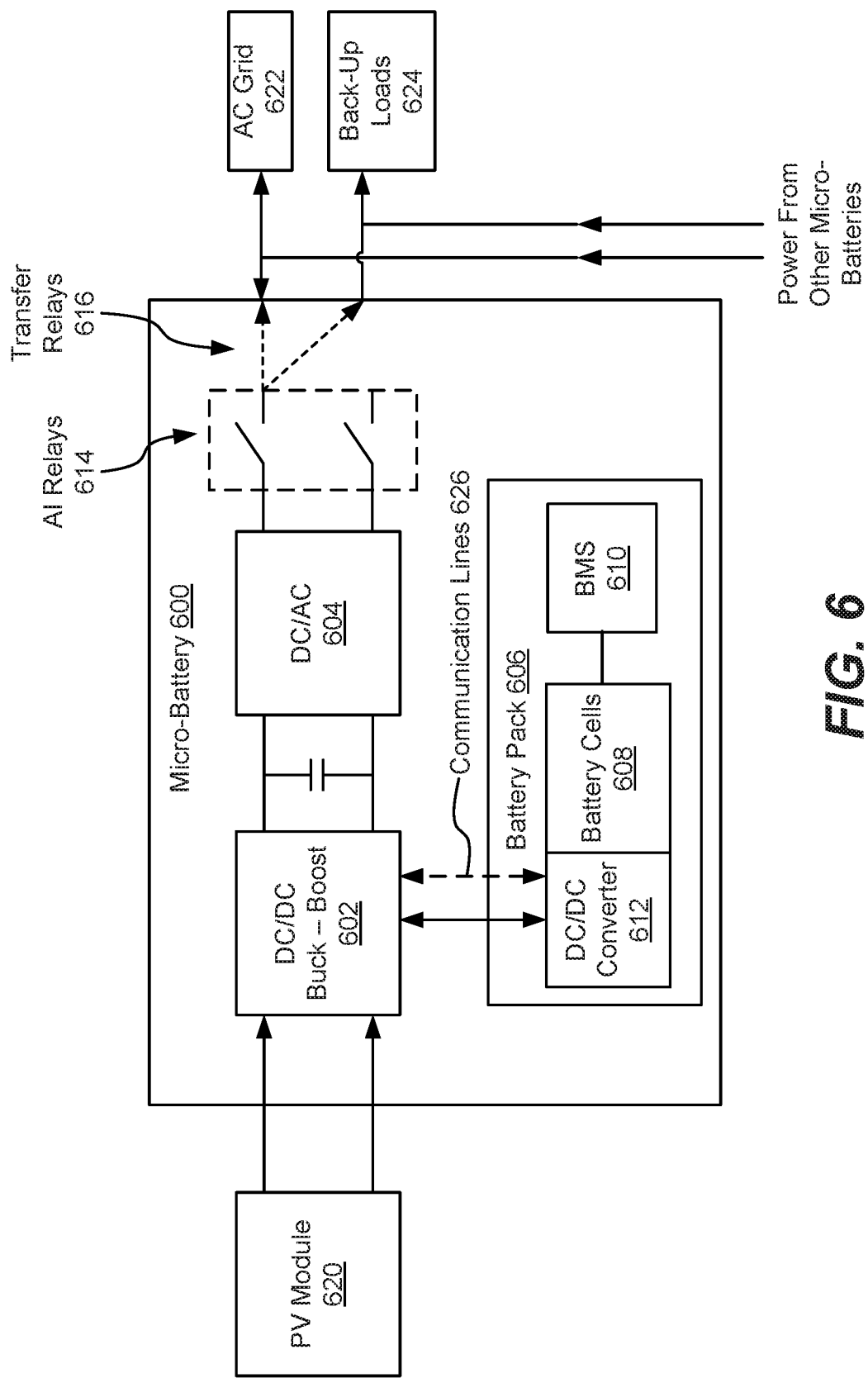
FIG. 6 is a block diagram of an exemplary micro-battery including power converters and a battery pack that are housed in the same enclosure, according to some embodiments of the present disclosure.

FIG. 6 is a block diagram illustrating the structure of exemplary micro-battery 600 including a power converter pair and a battery pack that are housed in the same enclosure, according to some embodiments of the present disclosure. The power converter pair can include DC-to-DC buck-boost converter 602 for receiving DC power from a respective PV module 620, which can be similar to any of PV modules 302*a*-*f* in FIG. 3, and a DC-to-AC inverter 604 for receiving converter power from DC-to-DC buck-boost converter 602. In some embodiments, DC-to-DC buck-boost converter 602 is directly coupled to PV module 620 for receiving generated DC power. DC-to-DC buck-boost converter 602 can boost the received DC power to a higher voltage level. For instance, DC-to-DC buck-boost converter 602 may convert the received DC voltage to a higher voltage level for outputting to DC-to-AC inverter 604. The higher voltage level can match the operating voltage level of AC grid 622 (i.e., AC grid 310 in FIG. 3) and/or operation of one or more back-up loads 624 (i.e., back-up loads 312 in FIG. 3). DC-to-AC inverter 604 can receive the boosted DC voltage and invert the boosted DC voltage to AC for outputting to AC grid 622 and/or back-up loads 624. In some embodiments, this micro-inverter can be called a "hybrid micro-inverter" if the battery pack is in a separate enclosure, or a "hybrid micro-battery" if the micro-inverter and battery pack are within the same enclosure.

Transfer relays 616 and anti-islanding (AI) relays 614 may be implemented within micro-battery 600 to direct power between DC-to-AC inverter 604 and either AC grid 622 or back-up loads 624. In various embodiments, when transfer relays 616 are in a first position, DC-to-AC inverter 604 can provide power to and receive power from AC grid 622 through AI relays 614, and when transfer relays 616 are in a second position, DC-to-AC inverter 604 may provide power to back-up loads 624 in off-grid situations. In some embodiments, transfer relays 616 and/or AI relays 614 can be internal to micro-battery 600 as shown in FIG. 6, or external to micro-battery 600.

According to some embodiments of the present disclosure, micro-battery 600 also includes battery pack 606 for storing energy and discharging the stored energy. Battery pack 606 can include battery cells 608 that may be any suitable energy storage device such as a lithium-ion battery, lead-acid battery, advanced lead acid battery, flow battery, organic battery, or other battery type and/or battery chemistries. Battery cells 608 can be managed by BMS 610 for monitoring its state of charge and for protecting battery cells 608 from operating outside its voltage, current, and temperature range. Battery cells 608 can store energy, such as DC power generated by PV module 620 or energy from AC grid 622 in the form of DC power. In some embodiments, the operating voltage level of battery pack 606 is similar to the voltage level of DC power generated by PV module 620. Accordingly, DC-to-DC buck-boost converter 602 may not need to convert the DC power generated by PV module 620 before outputting power to battery pack 606 for storage. In such instances, little to no power loss occurs when storing energy from PV module 620 into battery pack 606.

In other embodiments, the operating voltage level of battery pack 606 may not match the voltage level of DC power generated by PV module 620. For instance, the operating voltage level of battery pack 606 may be lower or higher than the voltage level of DC power generated by PV module 620. Thus, DC-to-DC buck-boost converter 602 can buck DC power generated by PV module 620 to a lower voltage level or boost to a higher voltage level that is compatible with the operating voltage level of battery pack 606. In some embodiments, battery pack 606 can include its own DC-to-DC buck-boost converter for managing the voltage level of incoming power. For instance, battery pack 606 can include DC-to-DC converter 612 to buck and boost power flowing into battery pack 606.

As can be appreciated by disclosures herein, DC-to-DC buck-boost converter 602 can be coupled to both PV module 620 and battery pack 606 so that power can be received by DC-to-DC buck-boost converter 602 from both PV module 620 and battery pack 606. Additionally, power can be outputted to battery pack 606 from DC-to-DC buck-boost converter 602.

Configuring micro-battery 600 to include DC-to-DC buck-boost converter 602 that is capable of bucking inputted power to a lower voltage level or boosting output power to a higher voltage level enables micro-battery 600 to directly store power into battery pack 606 from PV module 620 without having to first convert it to AC power, as required in PV system 200 in FIG. 2. Thus, utilizing micro-battery 600 in PV systems provides on-site energy storage without suffering from the inefficiencies of PV systems without micro-batteries.

Communication line 626 can be provided between DC-to-DC converter 602 and battery pack 606 so that DC-to-DC converter 602 may receive information, e.g., storage capacity, state of charge, voltage, current, temperature etc., regarding battery cells 608. Communication lines 626 can be wired communication lines (RS-485, RS-232, Modbus, CAN and the like) or wireless communication lines, such as, but not limited to, Zigbee, radio frequency (RF), Bluetooth, Wireless Fidelity (WiFi), and power-line communication (PLC).

In some embodiments, DC-to-DC converter 612 can be included in battery pack 606 for converting power flowing into and out of battery pack 606. DC-to-DC converter 612 can be a buck, a boost, or a buck and boost converter for stepping up and/or down voltage to and from battery cells 608. In embodiments, DC-to-DC converter 612 may be devoted to converting power into and out of battery cells 608. Accordingly, power provided by PV module 620 may first pass through DC-to-DC converter 612 before being stored in battery cells 608. Likewise, power provided from DC-to-AC inverter 604 (e.g., power originally provided from an AC grid) may first pass through DC-to-DC converter 612 before being stored in battery cells 608. Additionally, power provided by battery cells 608 can first be converted by DC-to-DC converter 612 before being inputted to DC-to-AC inverter 604. Thus, battery cells 608 may operate at various voltages regardless of the operating voltage of PV module 620 and AC grid 622. As a result, the configuration of micro-battery 600 may be very flexible and can be implemented in any PV system without having to modify its battery cells or the PV modules of that PV system.

According to some embodiments of the present disclosure, micro-battery 600 can output AC power to more than one power destination. As an example, micro-battery 600 can output to AC grid 622 and/or one or more back-up loads 624. AI relays 614 and transfer relays 616 allow micro-battery 600 to output power to one or both AC grid 622 and back-up loads 624. This enables micro-battery PV systems to be more versatile by allowing more than one type of power destination to receive power.

As shown in FIG. 6, converters and a battery pack can be housed within the same enclosure to form micro-battery 600. The enclosure may protect the internal components of micro-battery 600 from the environment. Additionally, the enclosure may enable micro-battery 600 to be separately mounted underneath a PV module. Having only one enclosure can minimize the amount of space occupied by micro-battery 600. It is to be appreciated, however, that embodiments are not limited to such configurations and that other embodiments may have some components of the micro-batteries that are not contained within the same enclosure. For instance, other embodiments can include converters 602 and 604 and battery pack 606 that are housed in separate enclosures, as shown in FIG. 7.

Figure 7:
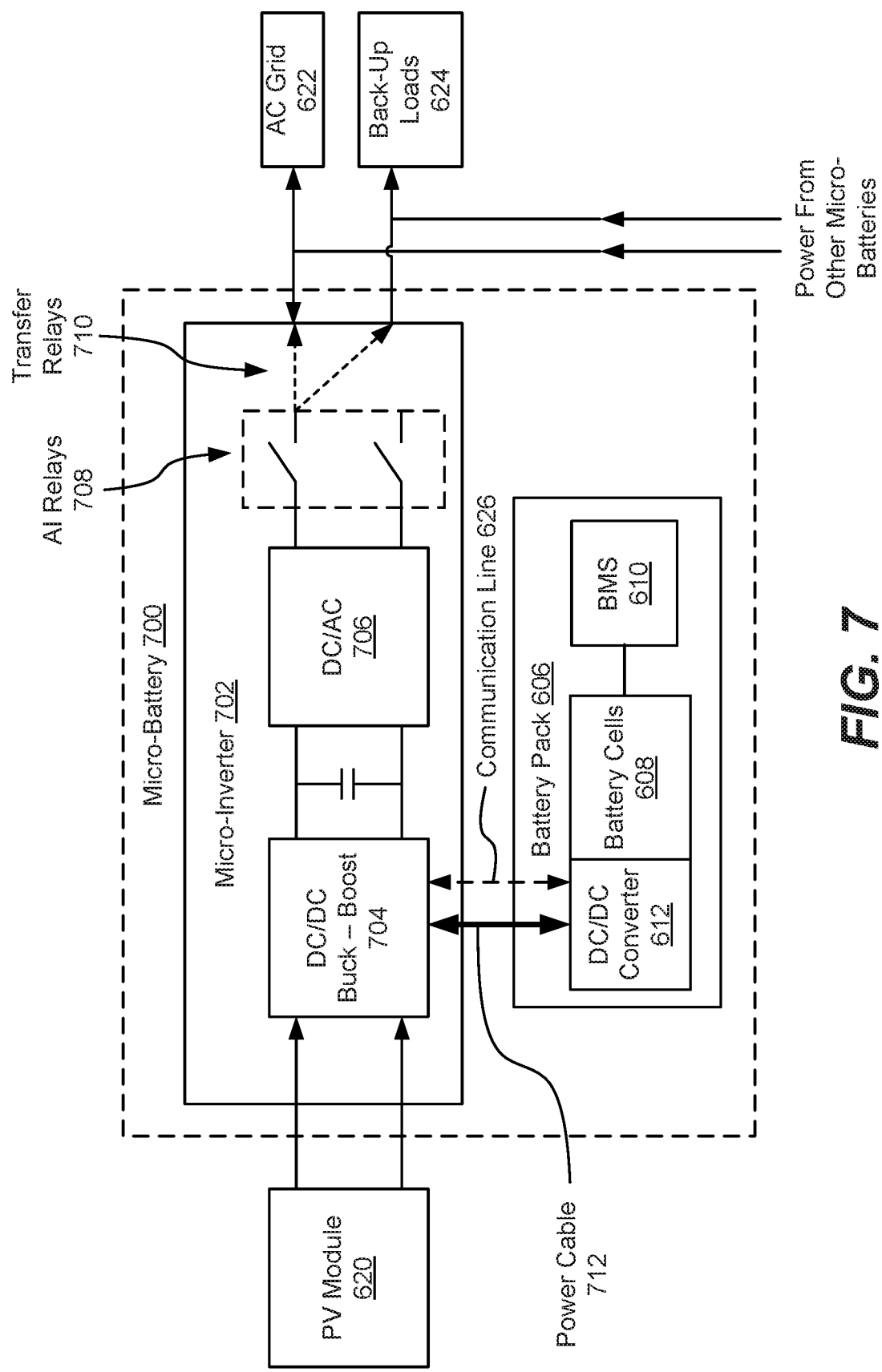
FIG. 7 is a block diagram of an exemplary micro-battery including power converters and a battery pack that are housed in separate enclosures, according to some embodiments of the present disclosure.

FIG. 7 is a block diagram illustrating exemplary micro-battery 700 including micro-inverter 702 and battery pack 606 that are housed in separate enclosures, according to some embodiments of the present disclosure. Micro-inverter 702 can include DC-to-DC buck-boost converter 704 and DC-to-AC inverter 706, both of which can be configured to perform functions similar to DC-to-DC buck and boost converter 602 and 604, respectively, discussed herein with respect to FIG. 6. Micro-inverter 702 can be housed in its own enclosure separate from battery pack 606. Thus, to enable power transfer between battery pack 606 and micro-inverter 702, power cable 712 can be implemented to couple DC-to-DC buck-boost converter 704 to battery pack 606. Micro-inverter 702 can be enclosed in a housing that has a socket for mating with a plug of power cable 712 so that power can be transferred between DC-to-DC buck-boost converter 704 and battery pack 606. Accordingly, even though DC-to-DC buck-boost converter 704 is housed within micro-inverter 702 separate from battery pack 606, DC-to-DC buck-boost converter 704 can still be directly coupled to both PV module 620 and battery pack 606 to enable battery pack 606 to store energy generated from PV module 620 before AC conversion to reduce inefficiencies with on-site energy storage for PV systems. By configuring micro-inverter 702 with a socket, various different types of battery packs having different power levels and capacities can be implemented in micro-battery 700. Reconfiguring micro-battery can be as easy as unplugging battery pack 606 from the socket and replacing it with another battery pack.

B. Revenue-Grade Meter Configuration

In a typical energy generation system, the inverter includes a high accuracy AC revenue-grade meter (RGM) at the output so that the solar provider and/or customer can ascertain how much PV power the system is generating at any given moment and over time, and in some cases so that the customer can be billed or compensated with energy credit. Typically, this information is transmitted via wired or wireless communication lines from the inverter to a wireless router located in the home or business so that it can be viewed on a local or remote graphical user interface. However, with the addition of a battery, it may be desirable to have the ability to make a more granular measurement of not only the inverter's output to the AC grid or back-up loads from PV in on-grid and off-grid situations, but also the respective outputs of the photovoltaic system and the battery (e.g., what percentage of the total AC power is attributed to each source). In certain cases, such as when there is an outage of grid, it may be desirable to bill a customer for the power supplied to AC grid or back-up loads via the battery pack or PV power in on-grid and off-grid situations, since ordinarily when the grid is down, a string inverter stops outputting power. In order to accomplish this, a revenue-grade meter system can be implemented in a micro-battery, as shown in FIG. 8.

Figure 8:
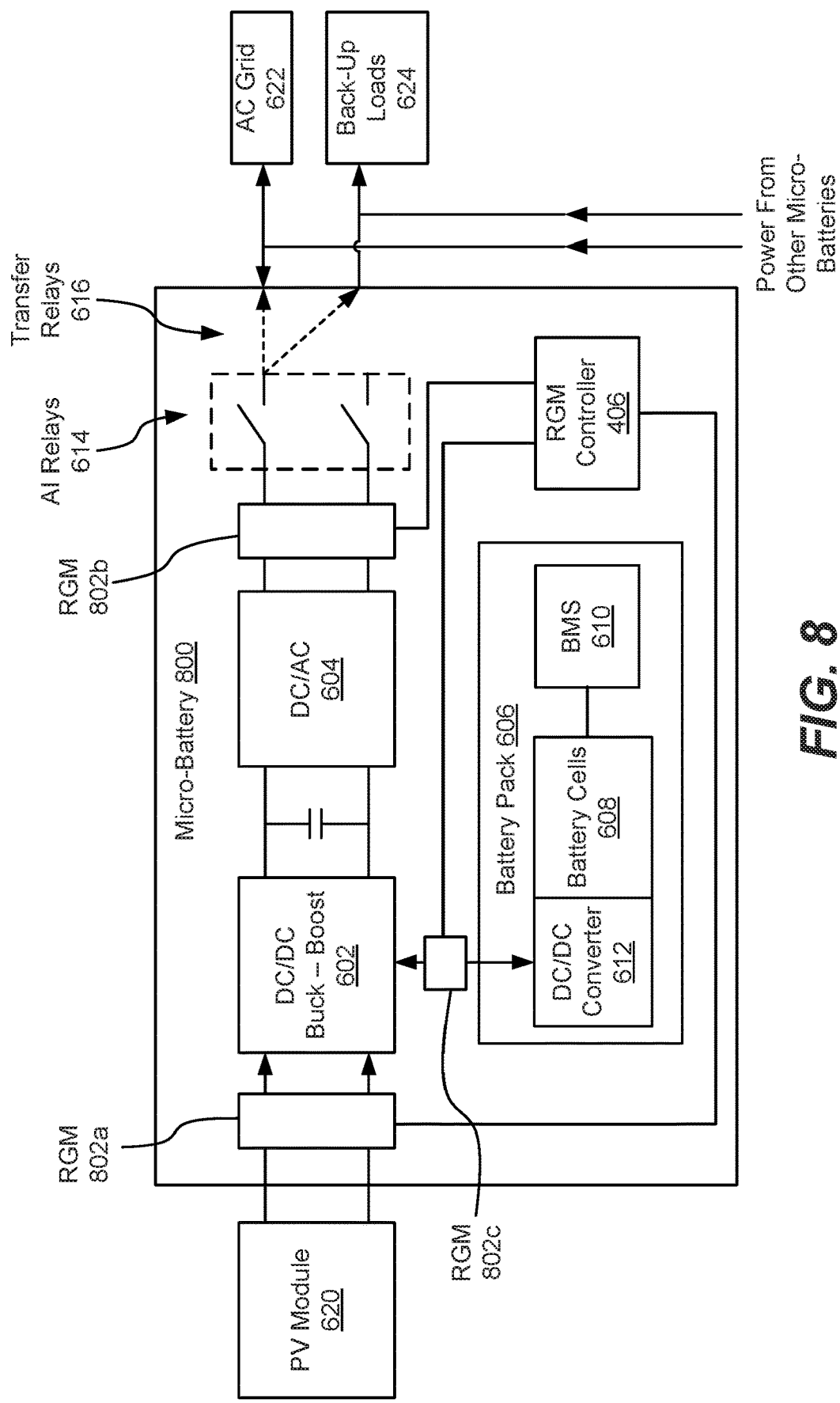
FIG. 8 is a block diagram illustrating an exemplary micro-battery configured with a revenue-grade meter system, according to some embodiments of the present disclosure.

FIG. 8 is a block diagram of micro-battery 800 including a revenue-grade meter system having revenue-grade meters (RGM) 802*a-c* and revenue-grade meter controller (RGM controller) 804, according to some embodiments of the present disclosure. The revenue grade meter itself could be a bi-direction high accuracy (0.5%-2%) current sensor and the controller could be a micro-controller to process the data from current sensor. For clarity and ease of understanding, components of micro-battery 800 that are similar to respective components in micro-battery 600 of FIG. 6 are numbered the same to indicate that such components function similarly and for the same reasons. Furthermore, even though FIG. 8 illustrates micro-battery 800 whose converters and battery pack are housed within the same enclosure, the discussion herein with respect to micro-battery 800 also apply to micro-batteries that have converters and battery packs housed in separate enclosures.

Each RGM 802*a-c* can be formed of a measurement circuit that can accurately measure and amount of power (from voltage and current data) that flows from an electrical device. Additionally, each RGM 802*a-c*, in certain embodiments of the present disclosure, can make separate DC measurements of power (from voltage and current data) within micro-battery 800 as well as power coming into and out of micro-battery 800. For instance, RGM 802*a* can accurately measure a total DC power received from PV module 620 by measuring the current, voltage, and/or power at the DC input channel for micro-battery 800. RGM 802*b* can accurately measure a total AC power outputted by micro-battery 800 to AC grid and/or back-up loads 624 by measuring the current, voltage, and/or power at the AC output channel for micro-battery 800. Additionally, RGM 802*c* can accurately measure a total DC power received from battery pack 606 by measuring the current, voltage, and/or power at the channel between DC-to-DC converter 602 and battery pack 606.

RGMs 802*a-c* can be coupled to RGM controller 406, which can be programmed to process the received data and determine the portion of total AC output measured by RGMs 802*a* and 802*c* attributable to PV module 620 and battery pack 606, respectively and in both on-grid and off-grid situations. By doing this, the combined AC output power measured by RGM 802*b* can be separately apportioned into power being generated by the PV system and the power being supplied by battery pack 606.

III. Multi-Phase and Split-Phase Micro-Battery PV Systems

As discussed herein with respect to FIGS. 3 and 4, AC power outputs of micro-batteries in a micro-battery PV system can be combined with other micro-batteries in the PV system. For instance, AC power outputted by micro-batteries 600, 700, and 800 shown in FIGS. 6, 7, and 8, respectively, can each be combined with other micro-batteries in their respective micro-battery PV system via an AC bus that includes power outputted from other micro-batteries. In some embodiments, each micro-battery can have converters that operate in a single phase but be balanced on multi-phases for a multi-phase application (for example: a three-phase application). The micro-batteries in a PV system can operate at the same phase, such as for single-phase PV systems, or at different phases, such as for multi-phase or split-phase PV systems.

A. Multi-Phase Micro-Battery PV System

Figure 9:
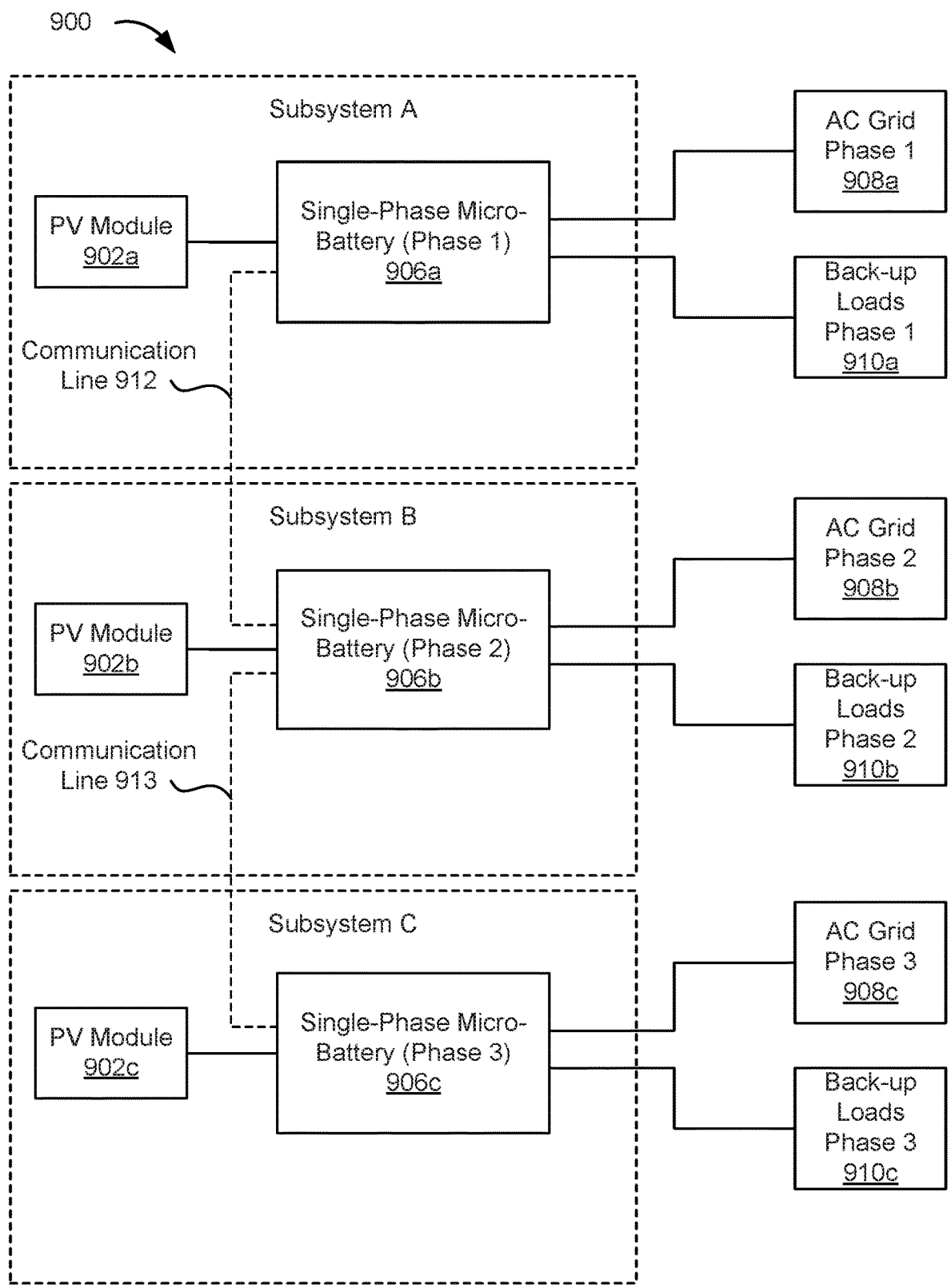
FIG. 9 is a block diagram of an exemplary micro-battery PV system configured for a AC multi-phase configuration, according to some embodiments of the present disclosure.

FIG. 9 is a simplified block diagram illustrating energy generation system 900 for providing AC power to a multi-phase AC grid or multi-phase back-up loads, according to embodiments of the present disclosure. Energy generation system 900 may include three subsystems: subsystem A, subsystem B, and subsystem C, where each subsystem is configured to provide AC power in each phase of the multiple phases. When combined, the three subsystems A, B, and C form a multi-phase system for providing multi-phase power. Multi-phase energy generation system 900 may be particularly useful for large buildings that span across a large area or demand high amounts of power, or for buildings that are located in regions whose laws require three-phase power systems or that house equipment requiring three-phase power above a certain power level. Additionally, this system may be useful for providing reactive power and power factor control. Reactive power and power factor control is where power stored in the micro-batteries from the PV modules can be used to support capacitive and/or inductive reactive power needed for grid voltage stabilization. There may be communication between the three subsystems to coordinate for proper phase balance/synchronization under three-phase AC grid or back-up loads.

According to some embodiments of the present disclosure, each subsystem may be a single-phase energy generation system having a micro-battery including a DC-to-DC converter and a DC-to-AC inverter configured to output single-phase AC power converted from DC power generated from a respective PV module or discharged by an energy storage device of the micro-battery. For instance, micro-battery 906*a* can be configured to receive DC power at an input of micro-battery 906*a* and store the DC energy in its battery pack or convert the received DC power to single-phase AC power and output the converted single-phase AC power to AC grid 908*a* or back-up loads 910*a*, each operating at a corresponding single phase. Micro batteries 906*b-c* may be similar in operation to micro-battery 906*a*, and micro-batteries 906*a-c* may be similar in construction to micro-batteries 600 or 700 discussed herein with respect to FIGS. 6 and 7, respectively.

Outputted AC power from respective micro-batteries in subsystems A-C may be outputted to AC grid 908*a-c* or back-up loads 910*a-c*, respectively. Each respective AC grid can operate in a phase corresponding to a respective subsystem. As an example, single-phase micro-battery 906*a* in subsystem A may be configured to output AC power in phase 1, single-phase micro-battery 906*b* in subsystem B may be configured to output AC power in phase 2, and single-phase micro-battery 906*c* in subsystem C may be configured to output AC power in phase 3. In embodiments, back-up loads for each subsystem may be different single phase and/or three phase loads in an installation site. As an example, back-up loads 910*a* may be appliances in a kitchen, back-up loads 910*b* may be devices in a bedroom, and back-up loads 910*c* may be lighting at the installation site.

Phases of output AC power from subsystems A-C may be offset from one another accordingly (for example: 120 degree electrical for a three-phase system). Thus, micro-batteries 906*a-c* may need to be coordinated with one another such that no two micro-batteries are outputting in the same phase. To coordinate the phases of AC outputs, each micro-battery can communicate with one another via communication lines 912 and 913. For instance, micro-battery 906*a* may output AC power in phase 1, and may send a command to micro-battery 906*b* to output AC power in phase 2, and a command to micro-battery 906*c* to output AC power in phase 3. Thus, outputted AC power from subsystems A-C may form a multi-phase system including phases 1-3.

Although FIG. 9 illustrates communication lines 912 and 913 are arranged in a serial configuration, embodiments of the disclosure need not be so limited. Other embodiments may have communication lines 912 and 913 arranged in a parallel configuration, or any other suitable configuration suitable for allowing micro-batteries 906*a-c* to communication with each other.

A. Split Single-Phase Micro Battery PV System

Figure 10:
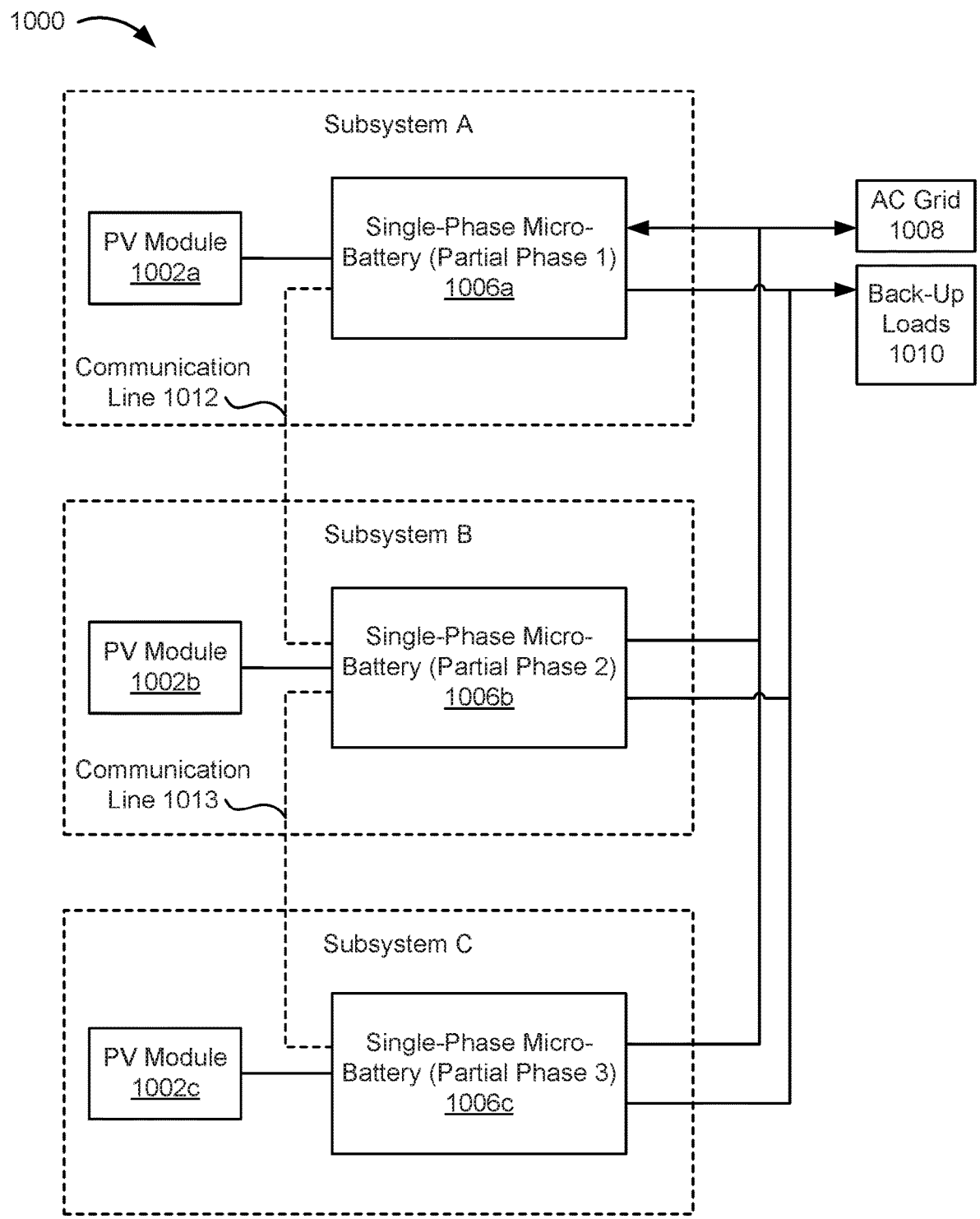
FIG. 10 is a block diagram of an exemplary micro-battery PV system configured for a split single-phase configuration, according to some embodiments of the present disclosure.

FIG. 10 is a simplified block diagram illustrating energy generation system 1000 including split single-phase micro-batteries for providing AC power to a single-phase AC grid or single-phase back-up loads, according to embodiments of the present disclosure. For example, in North America, though 120V and 240V AC grid is used, the 120V is a split-phase of a split single-phase system. Energy generation system 1000 may include three subsystems: subsystem A, subsystem B, and subsystem C, where each subsystem is configured to provide AC power in each partial phase of the single phases. When combined, the three subsystems A, B, and C form a split-phase energy generation system for providing single-phase power.

According to embodiments of the present disclosure, each subsystem may be a partial-phase energy generation system having a micro-battery that includes a DC-to-DC converter and a DC-to-AC inverter configured to output partial-phase AC power converted from DC power generated from arrays of PV strings or discharged by an energy storage device. For instance, micro-battery 906*a* can be configured to receive DC power at an input of micro-battery 906*a* and store the DC energy in its battery pack or convert the received DC power to partial-phase AC power and output the converted partial-phase AC power to an AC bus for outputting to AC grid 1008 or back-up loads 1010. Respective partial-phase AC power outputs from micro-batteries 1006*b* and 1006*c* may combine in the AC bus to form a complete single-phase power that can be outputted to AC grid 1008 or back-up loads 1010, each operating at the single phase. Micro batteries 1006*a-c* may be similar in operation to micro-battery 1006*a*, and micro-batteries 1006*a-c* may be similar in construction to micro-batteries 600 or 700 discussed herein with respect to FIGS. 6 and 7, respectively The partial phases of output AC power from subsystems A-C may be completely offset or in sync from one another. Thus, micro-batteries 1006*a-c* may need to be coordinated with one another such that no two micro-batteries are outputting in the same phase. To coordinate the phases of AC outputs, each micro-battery can communicate with one another via communication lines 1012 and 1013. For instance, micro-battery 1006*a* may output AC power in partial phase 1, and may send a command to micro-battery 1006*b* to output AC power in partial phase 2, and a command to micro-battery 1006*c* to output AC power in partial phase 3. Thus, outputted AC power from subsystems A-C may form a single-phase system including partial phases 1-3 when combined.

IV. Connection of Micro-Batteries in a Micro-Battery PV System

Power from the micro-battery packs may be interconnected for outputting power to an AC grid or back-up loads. In some embodiments, individual output voltages from the battery packs may aggregate and combine to output a larger voltage to the inverter by the mere virtue of their connection with one another and without requiring each micro-battery to boost its output voltage. For instance, in some embodiments, the micro-batteries may be arranged in a serial connection as shown in FIG. 11.

Figure 11:
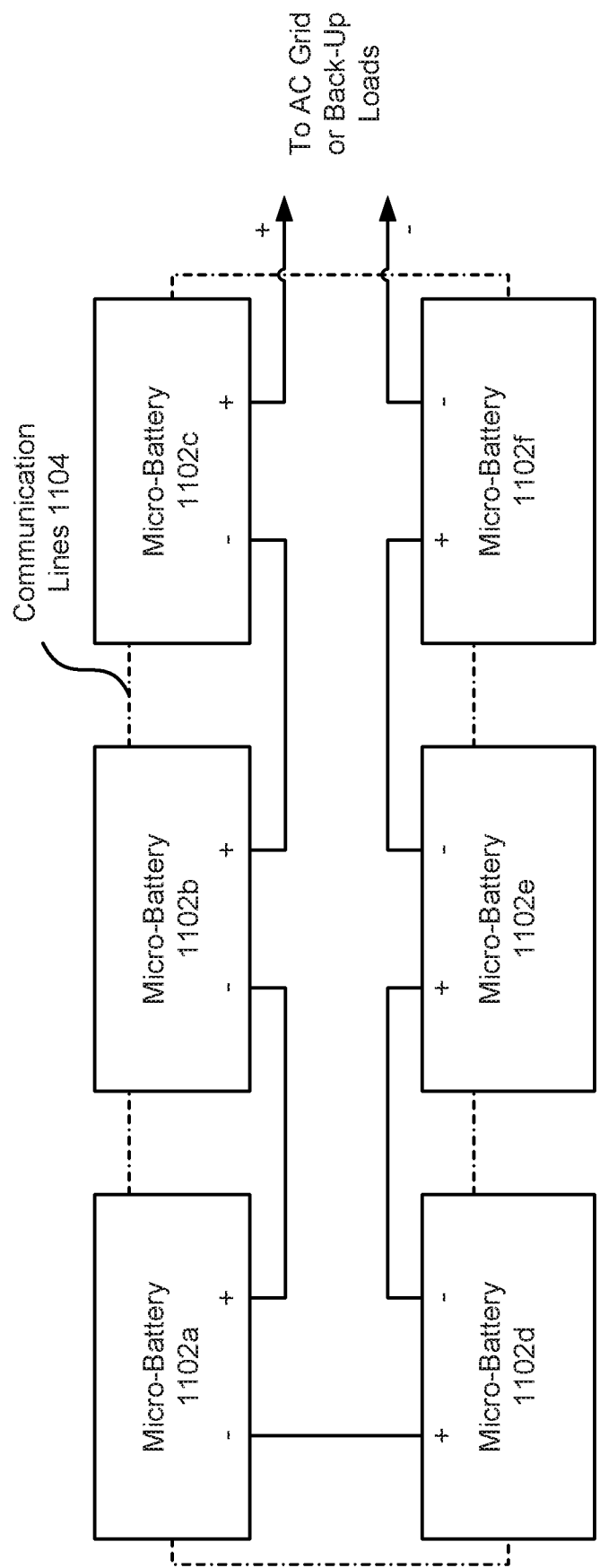
FIG. 11 is a block diagram of a serial interconnection between micro-battery packs for a micro-battery PV system, according to some embodiments of the present disclosure.

FIG. 11 illustrates a block diagram of micro-battery packs 1102*a-f* for a micro-battery PV system (e.g., micro-battery PV systems 300 or 400 in FIGS. 3 and 4, respectively) that are connected in a serial configuration, according to some embodiments of the present disclosure. Each battery pack 1102*a-f* may be positioned proximate to a respective PV module (not shown), similar to the position of battery packs 304*a-f* with respect to PV modules 302*a-f* in FIG. 3. Furthermore, each micro-battery 1102*a-f* can include a DCto-DC converter, a DC-to-AC inverter, and a battery pack, such as micro-batteries 600 and 700 in FIGS. 6 and 7, respectively, for converting and storing energy.

As shown in FIG. 11, micro-batteries 1102a-f may be coupled together in a serial circuit arrangement such that positive and negative terminals for each micro-battery are coupled to opposite polarities of adjacent micro-batteries. As an example, the positive terminal of micro-battery 1102f may be coupled to the negative terminal of micro-battery 1102e, whose positive terminal is coupled to the negative terminal of micro-battery 1102d, and so on and so forth. Accordingly, voltage provided by each micro-battery 1102a-f may be aggregated into a larger voltage by virtue of the serial connection. By connecting micro-batteries 1102a-f in this serial arrangement, the output voltage of the system is greater than the output of each micro-battery individually. Thus, the output voltage of each micro-battery is naturally stepped up by the mere nature of the serial connection. Such PV systems require fewer components, are less complex to operate, and have less voltage conversions, which increases efficiency and lowers cost.

Figure 12:
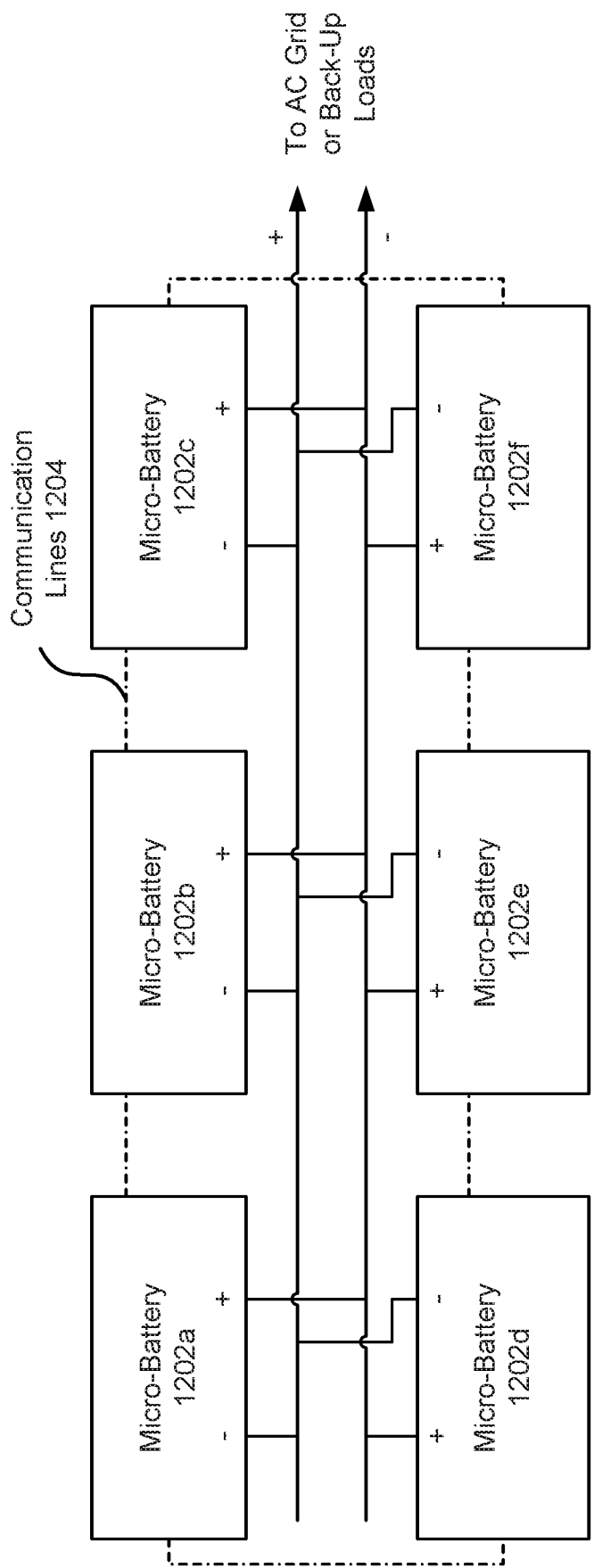
FIG. 12 is a block diagram of a parallel interconnection between micro-battery packs for a micro-battery PV system, according to some embodiments of the present disclosure.

Other than the serial connection shown in FIG. 11, other micro-battery PV systems can be connected in a parallel configuration to provide more current/power to an AC grid or back-up loads, as shown in FIG. 12. FIG. 12 is a block diagram illustrating micro-battery packs 1202a-f for a micro-battery PV system (e.g., micro-battery PV systems 300 or 400 in FIGS. 3 and 4, respectively) that are connected in a parallel configuration, according to some embodiments of the present disclosure. The positive terminals of micro-batteries 1202a-f can be coupled to a positive terminal bus, and the negative terminals can be coupled to a negative terminal bus. Coupling micro-batteries 1202a-f in a parallel configuration can increase the current/power output of the PV system for outputting to an AC grid or back-up loads.

Although FIGS. 11 and 12 illustrate only six micro-batteries for a corresponding string of PV modules, embodiments are not so limited. Other embodiments may have more or less micro-batteries, and at least as many PV modules than micro-batteries without departing from the spirit and scope of the present disclosure.

In certain embodiments, each micro-battery can communicate with adjacent micro-batteries via a plurality of communication lines (e.g., communication lines 1104 in FIG. 11 and communication lines 1204 in FIG. 12) represented by dotted and dashed lines, so that the micro-batteries can communicate with each other, such as to send instructions to, and receive status information from, each micro-battery. Micro-batteries 1102a-f can form a mesh network to communicate with one another. The communication lines can be wired (e.g., RS-485, RS-232, Modbus, CAN and the like) or wireless (e.g., PLC (power-line communication), Zigbee, RF, Bluetooth, Wi-Fi, and the like) communication lines.

Although the disclosure has been described with respect to specific embodiments, it will be appreciated that the disclosure is intended to cover all modifications and equivalents within the scope of the following claims.

What is claimed is:

1. An energy generation system, comprising: a photovoltaic (PV) array comprising a plurality of PV modules for generating direct current (DC) power; a plurality of battery packs, each battery pack of the plurality of battery packs being configured to store DC power generated by a respective one of the plurality of PV modules; and a plurality of power converter pairs coupled to the plurality of PV modules and to the plurality of battery packs, the plurality of power converter pairs being configured to convert the generated DC power to alternating current (AC) power, each power converter pair of the plurality of power converter pairs comprises a DC-to-DC converter directly coupled to a DC-to-AC inverter, wherein the DC-to-DC converter is directly coupled to a respective PV module and directly coupled to a respective battery pack, wherein each battery pack of the plurality of battery packs is configured to output stored DC power only to the respective DC-to-DC converter of the respective power converter pair, wherein the plurality of power converter pairs and the plurality of battery packs form a plurality of micro-batteries, each micro-battery comprising a power converter pair of the plurality of power converter pairs and a respective battery pack of the plurality of battery packs and wherein at least one micro-battery of the plurality of micro-batteries is coupled to more than one PV module of the plurality of PV modules.

2. The energy generation system of claim 1, wherein the DC-to-DC converter of each power converter pair is configured to buck and boost the generated DC power from the respective PV module.

3. The energy generation system of claim 1, wherein each battery pack is coupled to its respective power converter pair through a power cable that is plugged into a socket of a housing for the respective power converter pair.

4. The energy generation system of claim 1, wherein the plurality of micro-batteries are serially connected.

5. The energy generation system of claim 1, wherein the plurality of PV modules and the plurality of micro-batteries are equal in number.

6. The energy generation system of claim 1, wherein each micro-battery is coupled to less than all PV modules of the plurality of PV modules.

7. The energy generation system of claim 1, wherein each battery pack includes battery cells and a battery management system (BMS).

8. The energy generation system of claim 7, wherein each battery pack further comprises a battery pack DC-to-DC converter configured to buck and boost DC power from the DC-to-DC converter of the respective power converter pair.

9. An energy generation system, comprising: a photovoltaic (PV) array comprising a plurality of PV modules for generating direct current (DC) power; and a plurality of micro-batteries coupled to the plurality of PV modules, each micro-battery comprising: a DC-to-DC converter directly coupled to a respective PV module of the plurality of PV modules and configured to receive generated DC power from the respective PV module and convert the generated DC power to a converted DC power having a different voltage level than the generated DC power; a DC-to-AC inverter directly coupled to the DC-to-DC converter and configured to receive the converted DC power and convert the converted DC power to alternating current (AC) power; and a battery pack directly coupled to the DC-to-DC converter, the battery pack configured to store DC power from the respective PV module through the DC-to-DC converter and output stored DC power only to the DC-to-DC converter, wherein the plurality of micro-batteries are coupled to less than all PV modules of the plurality of PV modules.

10. The energy generation system of claim 9, wherein the DC-to-DC buck-boost converter, the DC-to-AC inverter, and the battery pack are housed within the same enclosure.

11. The energy generation system of claim 9, wherein the DC-to-DC converter of each inverter is configured to buck and boost the generated DC power from the respective PV module.

12. The energy generation system of claim 9, wherein the battery pack comprises battery cells and a battery pack DC-to-DC converter configured to output stored DC power only to the DC-to-DC converter.

13. The energy generation system of claim 9, wherein a first micro-battery of the plurality of micro-batteries is configured to supply power to a first backup load and a second micro-battery of the plurality of micro-batteries is configured to supply power to a second backup load different than the first backup load.

14. An energy generation system, comprising: a photovoltaic (PV) array comprising a plurality of PV modules for generating direct current (DC) power; and a plurality of micro-batteries coupled to the plurality of PV modules, each micro-battery comprising: a DC-to-DC converter directly coupled to a respective PV module of the plurality of PV modules and configured to receive generated DC power from the respective PV module and convert the generated DC power to a converted DC power having a different voltage level than the generated DC power; a DC-to-AC inverter directly coupled to the DC-to-DC converter and configured to receive the converted DC power and convert the converted DC power to alternating current (AC) power; and a battery pack directly coupled to the DC-to-DC converter, the battery pack configured to store DC power from the respective PV module through the DC-to-DC converter and output stored DC power only to the DC-to-DC converter, wherein a first micro-battery of the plurality of micro-batteries is configured to supply power to a first backup load and a second micro-battery of the plurality of micro-batteries is configured to supply power to a second backup load different than the first backup load.

* * * * *